US008686837B2

(12) United States Patent
Larsen et al.

(10) Patent No.: US 8,686,837 B2
(45) Date of Patent: Apr. 1, 2014

(54) WIRELESS REMOTE

(75) Inventors: Jan P T Larsen, Hudson, WI (US); Michael R. Eul, Mahtomedi, MN (US)

(73) Assignee: Frontrow Calypso, LLC, Petaluma, CA (US)

( * ) Notice: Subject to any disclaimer, the term of this patent is extended or adjusted under 35 U.S.C. 154(b) by 0 days.

(21) Appl. No.: 13/149,341

(22) Filed: May 31, 2011

(65) Prior Publication Data

US 2011/0229144 A1    Sep. 22, 2011

Related U.S. Application Data

(63) Continuation of application No. 11/759,792, filed on Jun. 7, 2007, now abandoned.

(51) Int. Cl.
*G08C 19/12* (2006.01)
(52) U.S. Cl.
USPC ........ 340/13.24; 341/176; 348/734; 398/106; 398/128; 455/41.2; 455/41.3
(58) Field of Classification Search
USPC ........... 340/825.72, 13.24; 341/176; 348/734; 398/106, 128; 455/41.2, 41.3
See application file for complete search history.

(56) References Cited

U.S. PATENT DOCUMENTS

| 4,410,983 | A | * | 10/1983 | Cope | 710/100 |
|---|---|---|---|---|---|
| 5,396,243 | A | * | 3/1995 | Jalink et al. | 342/54 |
| 5,583,560 | A | * | 12/1996 | Florin et al. | 725/40 |
| 5,884,148 | A | * | 3/1999 | Bilgic et al. | 455/74.1 |
| 5,917,425 | A | * | 6/1999 | Crimmins et al. | 340/8.1 |
| 6,088,586 | A | * | 7/2000 | Haverty | 455/422.1 |
| 6,407,779 | B1 | * | 6/2002 | Herz | 348/734 |
| 6,424,660 | B2 | * | 7/2002 | Jacobson, Jr. | 370/475 |
| 6,903,650 | B2 | * | 6/2005 | Murray | 340/5.23 |
| 7,061,476 | B2 | * | 6/2006 | Fujiwara et al. | 345/2.2 |
| 7,130,584 | B2 | * | 10/2006 | Hirvonen | 455/41.2 |
| 7,139,945 | B2 | * | 11/2006 | Ong | 714/718 |
| 7,174,130 | B2 | * | 2/2007 | Kurisko et al. | 455/41.2 |
| 7,180,420 | B2 | * | 2/2007 | Maurer | 340/572.1 |
| 7,193,975 | B2 | * | 3/2007 | Tsutsumi et al. | 370/254 |

(Continued)

FOREIGN PATENT DOCUMENTS

| WO | WO-00-70583 | * | 11/2000 | G09B 5/08 |
|---|---|---|---|---|
| WO | WO-2000070583 A1 | | 11/2000 | |
| WO | WO-0167040 A1 | | 9/2001 | |
| WO | WO-2008153875 A1 | | 12/2008 | |

OTHER PUBLICATIONS

"U.S. Appl. No. 11/759,792, Non Final Office Action mailed Nov. 29, 2010", 23 pgs.

(Continued)

*Primary Examiner* — Benjamin C Lee
*Assistant Examiner* — Quang D Pham
(74) *Attorney, Agent, or Firm* — Birch, Stewart, Kolasch & Birch, LLP

(57) ABSTRACT

Various embodiments include apparatus, systems, and methods including an apparatus comprising a remote operable to receive a non-radio frequency beacon signal, the non-radio frequency beacon signal transmitted within and contained substantially within an approximate line-of-sight transmission space, the non-radio frequency beacon signal including at least one channel information portion, wherein the channel information portion includes information indicating a radio frequency, the remote operable to establish bi-directional communications using the radio frequency designated by the at least one channel information portion.

20 Claims, 9 Drawing Sheets

(56) References Cited

U.S. PATENT DOCUMENTS

| | | | |
|---|---|---|---|
| 7,215,649 B2* | 5/2007 | Yu et al. | 370/313 |
| 7,324,815 B2* | 1/2008 | Ross et al. | 455/425 |
| 7,375,673 B2* | 5/2008 | Spilo | 341/176 |
| 7,391,975 B2* | 6/2008 | Oettinger et al. | 398/129 |
| 7,610,018 B2* | 10/2009 | Marin et al. | 455/63.3 |
| 7,643,852 B2* | 1/2010 | Noll et al. | 455/561 |
| 7,727,418 B2* | 6/2010 | Momose et al. | 252/301.16 |
| 7,818,482 B2* | 10/2010 | Shimozawa et al. | 710/72 |
| 8,139,945 B1 | 3/2012 | Amir et al. | 398/126 |
| 2001/0016489 A1* | 8/2001 | Haymes et al. | 455/423 |
| 2002/0159434 A1* | 10/2002 | Gosior et al. | 370/350 |
| 2003/0145070 A1* | 7/2003 | Cariffe | 709/220 |
| 2003/0148773 A1* | 8/2003 | Spriestersbach et al. | 455/456 |
| 2003/0169156 A1* | 9/2003 | Perret | 340/310.01 |
| 2003/0201939 A1* | 10/2003 | Reece et al. | 343/700 MS |
| 2004/0133704 A1* | 7/2004 | Krzyzanowski et al. | 709/250 |
| 2004/0153884 A1* | 8/2004 | Fields et al. | 714/52 |
| 2004/0203352 A1* | 10/2004 | Hall et al. | 455/41.1 |
| 2004/0223660 A1* | 11/2004 | Zank et al. | 382/277 |
| 2005/0083882 A1* | 4/2005 | Sayers | 370/331 |
| 2005/0099653 A1* | 5/2005 | Kawaoka | 358/1.15 |
| 2006/0068750 A1* | 3/2006 | Burr | 455/343.1 |
| 2006/0085579 A1* | 4/2006 | Sato | 710/73 |
| 2006/0087474 A1* | 4/2006 | Do et al. | 342/386 |
| 2006/0099943 A1* | 5/2006 | Koo | 455/432.1 |
| 2006/0116667 A1* | 6/2006 | Hamel et al. | 606/1 |
| 2006/0181390 A1* | 8/2006 | Zigmond et al. | 340/5.22 |
| 2006/0210278 A1* | 9/2006 | Cregg et al. | 398/107 |
| 2006/0228684 A1* | 10/2006 | Yoon | 434/307 A |
| 2006/0270465 A1* | 11/2006 | Lee et al. | 455/569.1 |
| 2006/0274166 A1* | 12/2006 | Lee et al. | 348/231.99 |
| 2007/0139214 A1* | 6/2007 | Andersen et al. | 340/825.69 |
| 2007/0171091 A1* | 7/2007 | Nisenboim et al. | 340/825.69 |
| 2007/0279247 A1* | 12/2007 | Rye et al. | 340/825.72 |
| 2008/0003946 A1* | 1/2008 | Lee et al. | 455/41.2 |
| 2008/0075471 A1* | 3/2008 | Flachs et al. | 398/202 |
| 2008/0157993 A1* | 7/2008 | Du Breuil et al. | 340/825 |
| 2008/0186176 A1* | 8/2008 | Hardacker et al. | 340/572.1 |
| 2008/0186979 A1* | 8/2008 | Kolar | 370/395.53 |
| 2008/0188181 A1* | 8/2008 | Choi et al. | 455/41.2 |
| 2008/0215777 A1* | 9/2008 | Richenstein et al. | 710/69 |
| 2008/0224869 A1* | 9/2008 | Kaplan | 340/572.1 |
| 2008/0280624 A1* | 11/2008 | Wrappe | 455/456.1 |
| 2008/0303707 A1 | 12/2008 | Larsen et al. | |
| 2009/0016248 A1* | 1/2009 | Li et al. | 370/310.1 |
| 2009/0315715 A1 | 12/2009 | Larsen | |
| 2010/0113086 A1* | 5/2010 | Chang et al. | 455/525 |

OTHER PUBLICATIONS

"International Application Serial No. PCT/US2008/007016, Search Report mailed Aug. 7, 2008", 2 pgs.
"International Application Serial No. PCT/US2008/007016, Written Opinion mailed Aug. 7, 2008", 10 pgs.

* cited by examiner

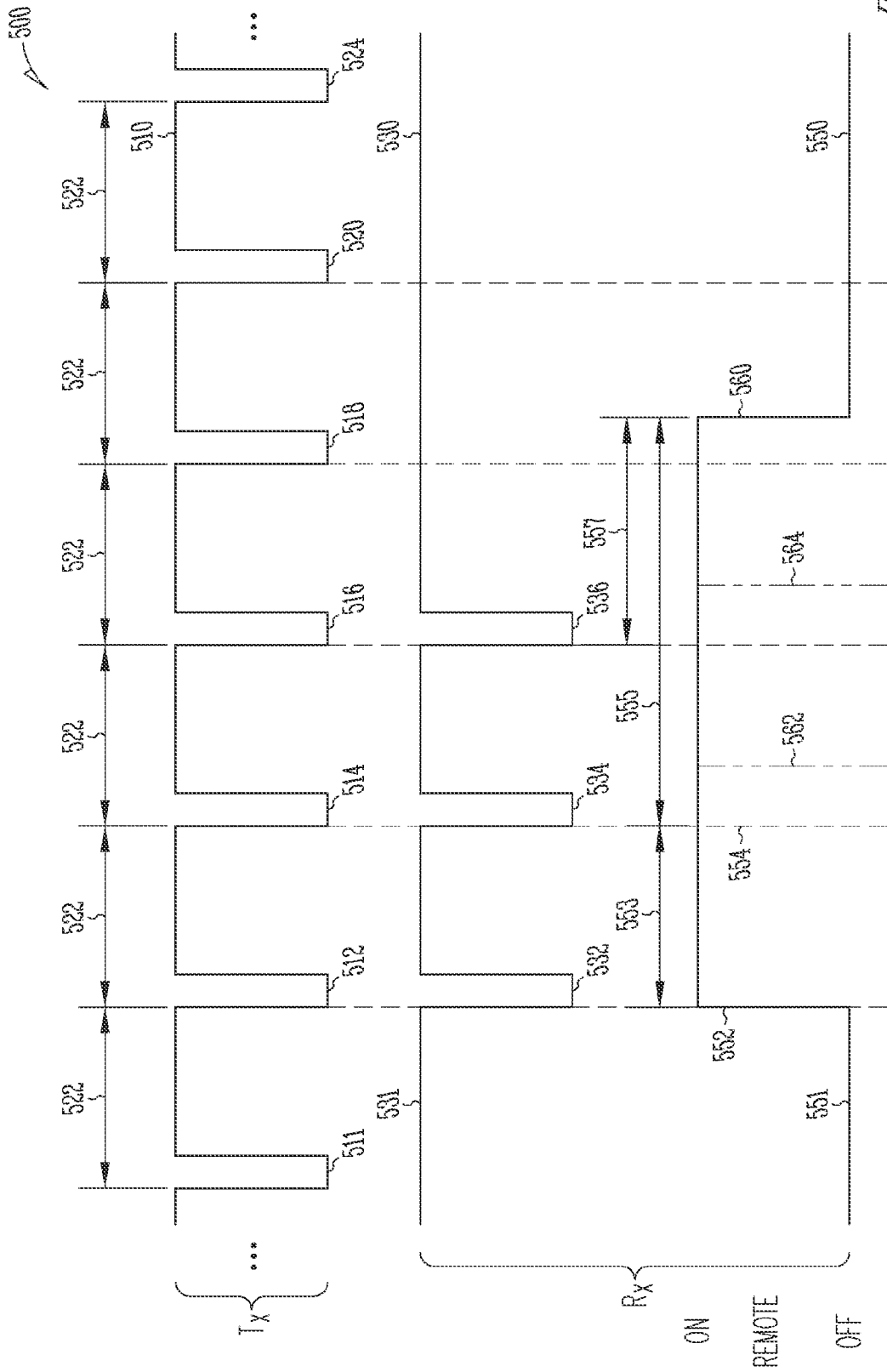

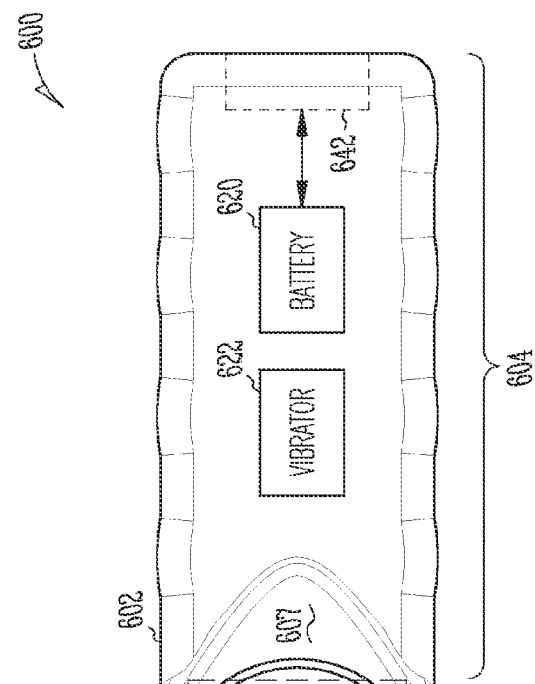
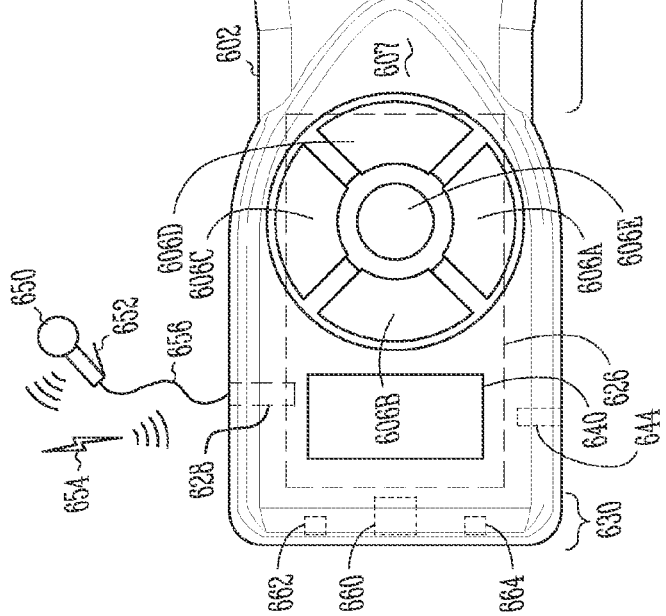
Fig. 6A
Fig. 6B

WIRELESS REMOTE

CLAIM OF PRIORITY

This application is a continuation of and claims the benefit of priority under 35 U.S.C. §120 to U.S. patent application Ser. No. 11/759,792, filed on Jun. 7, 2007, which is hereby incorporated by reference herein in its entirety.

FIELD OF THE INVENTION

The invention relates generally to communication systems, and more specifically to communication systems having a wireless remote.

BACKGROUND

Wireless devices are useful in communication systems for controlling and for one and two-way communications with other devices in the system. Examples of wireless devices include remote controls for garage door openers and televisions, cellular telephones, and wireless microphones. By virtue of being wireless, the wireless devices eliminate the need to be coupled through some type of a physical connection to the system, and thus are more portable. In many instances where these wireless devices are employed, each individual wireless device must be separately programmed in order to properly operate in a designated system, and requires re-programming in order to operate in a different system, or to operate with different other devices.

For example, a wireless remote for a garage door opener generally uses signals transmitted at some radio frequency. The signals typically includes a program code that must be set to match the code in the garage door opener system in order to allow the wireless remote to operate in the intended system. This program code is also used as a measure to prevent the controller from inadvertently opening another garage door, for example the neighbor's garage door, and to prevent unauthorized wireless controllers from being able to operate in the system in which the authorized wireless remote is operating. However, the wireless remote must be reprogrammed if the wireless remote is needed for operation in a different garage door system.

In another example wherein a wireless remote is employed as a television remote control, the wireless control needs to control the intended device (television or other electronic devices) without causing interference with a neighboring device (e.g., the television in the neighbor's house). Television remote controls generally operate using wavelengths in the infrared frequency range to transmit signals from the remote to the television, wherein the infrared frequencies are generally limited to a line-of-sight transmission path. Since a line-of-sight transmission path is obstructed by walls and other structural features usually associated with a home or building, the television remote is unlikely to interfere with another television or device that is not in a line-of-sight with the remote. This is generally true even when many of these remotes are operated in close proximity to one another but are separated by the structural obstructions, such as in an multi-unit apartment where remotes are operated in individual apartments without causing inference between apartments. One drawback of infrared signaling is that devices that use infrared signals have large power requirements as compared to devices that use radio frequency transmissions. However, because television remote controls generally only operate in a transmission mode for a fraction of the time the television is being used, a television remote does not require an excessively large battery, or frequent battery replacement or battery recharging.

Unlike television remotes, devices that use infrared transmissions and that have continual transmissions (e.g., a wireless microphone with high duty cycle or continuous periods of transmissions) have large power requirements compared to radio frequency devices. In order to meet the power requirements for an acceptable period of time (e.g., multiple hours of operation between battery replacements or recharging) the battery or batteries must be made larger, resulting in the wireless remote devices being bulky and heavy. In some remote devices, the use of an infrared frequency for such transmissions would limit operation times between battery recharge cycles to less than an full day, perhaps to only a few hours. In addition, a bulky and heavy remote device would be cumbersome for a user, such as a teacher, to hold and carry during a full work day, such as an entire school day. Further, a bulky and heavy remote device makes attaching the remote device to clothing of the user cumbersome, and in some instances even too cumbersome to be practical.

In wireless microphones, the use of radio frequency transmissions for a wireless microphone creates difficulties when two or more wireless microphones are used in close proximity to one another (e.g., in adjoining classrooms). In order to prevent interference between these microphones, each wireless microphone is often pre-programmed to a specific and separate frequency or channel to prevent interference with other wireless microphones operating in relatively close proximity, and to prevent interference between the systems associate with the separate wireless microphones. However, because each wireless microphone is pre-programmed to a specific frequency or channel, they cannot be moved to a different system, such as a local or adjacent room, without the need to re-program the moved wireless microphone to operate in the new system.

In addition, wireless microphones present a danger of inadvertent transmission. For example, if the user of the wireless microphone inadvertently forgets to turn off the microphone, unintended or even confidential conversation can reach the microphone and be broadcast to unintended listeners.

What is needed is one or more apparatus, systems, and methods to allow remote devices to automatically begin and to automatically terminate communications with one or more other devices as the remote devices are moved to and from the proximity of a given system, to prevent cross talk or other inadvertent interference between remotes devices, especially when these remotes are operating in a relatively close proximity to one another, and to minimize the chance of interference or inadvertently cross talk with other devices also transmitting signals in the area where the remote devices are being used Further, what is needed are remote devices that do not require re-programming when moved between systems, and that can automatically determine when a system is present on which communications can be established, and can automatically determine how to establish the communications in the newly detected system while minimizing or eliminating any interference between systems.

BRIEF DESCRIPTION OF THE FIGURES

FIG. 5 illustrates waveforms according to various embodiments;

FIGS. 6A-B illustrate a remote according to various embodiments;

DETAILED DESCRIPTION

Figure 1:
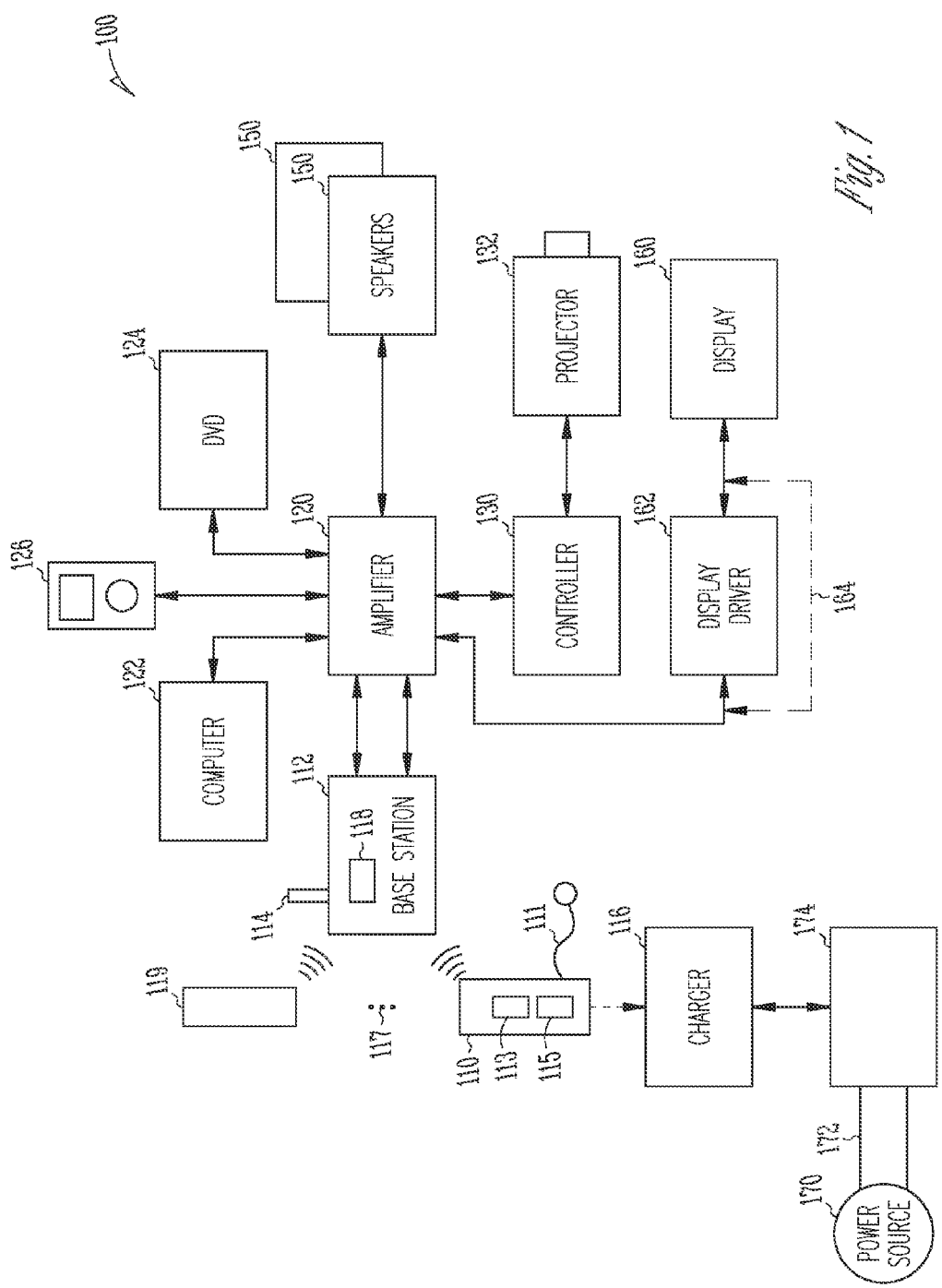
FIG. 1 illustrates a system according to various embodiments.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the subject matter described herein. It is intended that this subject matter be limited only by the claims, and the full scope of equivalents thereof.

Such embodiments of the subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

Embodiments of the present invention include apparatus, systems, and methods for communications between one or more remotes and one or more base stations coupled in a communications system. The remotes are operable to automatically establish bi-directional communications between the given remote and any one of the base stations in a system, while avoiding interference and cross talk between the given remote and any other remotes operating in close proximity, and while avoiding interference and cross talk between the given remote and any base station in the system besides the base station the given remote has established bi-directional communications with. In various embodiments, each remote automatically turns on and establishes bi-directional communications with a base station upon entering a room where the base station is operating, and automatically shuts off upon exiting the room where the base station is operating.

In various embodiments, the one or more remotes are operable to move between enclosures, such as but not limited to rooms in a building or other structure, wherein each of the enclosures includes a different base station, and to establish bi-directional communications with the base station in the enclosure where the remote is located without having to re-program the remote.

In various embodiments, the remote is operable to communicate separately and at any given time with any one of the base stations when the remote is within an approximate line-of-sight transmission space of the base station. An approximate line-of-sight transmission space refers to the space around a source of a signal into which the signal, when transmitted, would reach with a sufficient signal strength to be detectable by the one or more remotes. An approximate line-of-sight transmission space is not limited to space having only a direct visual line of sight to the source of the signal, and may include space receiving the signal as a result of reflections of the signal off any objects or surfaces capable of reflecting the transmitted signal to some extent, and may include transmission of the signal through objects that permit the signal to pass through.

By way of illustration and not by way of limitation, a typical wall within a building does not allow the penetration of a transmitted signal having a wavelength in the infrared frequency range. Therefore, space beyond a wall on the opposite side of the wall from the source of an infrared signal would typically be outside the approximate line-of sight transmission space for the signal. However, in various instances the side of the wall facing the source of the signal may be reflective of the signal to some extend, and thus provides reflected portions of the signal to areas on the side of the wall facing the source of the signal that may not otherwise be in a direct line-of-sight with the source of the signal, but nonetheless are included in the approximate line-of-sight transmission space due to receiving the reflected portions of the signal reaching the space.

A line-of-sight transmission signal is a signal, such as but not limited to an infrared signal, that, when transmitted, substantially fills an approximate line-of-sight transmission space, either through direct line-of-sight transmission or though reflection or transmission through an object, or though both direct line-of-sight transmission and through reflection or transmission through an object, and does not penetrate through solid objects. In one embodiment, the line-of-sight transmission signal frequency is selected such that solid objects include but are not limited to walls, ceilings, and floors used in building structures, such as but not limited to homes, schools, hospitals. In one embodiment, the line-of-sight transmission signal frequency is selected such that solid objects include the physical structures used to construct passenger areas within vehicles such as automobiles, buses, aircraft, and boats.

In various embodiments, each of the base stations provide a beacon signal including an electromagnetic energy transmitted at a wavelength having a non-radio frequency, such as but not limited to a frequency having an infrared wavelength, or a frequency having a wavelength within the visible light spectrum. In various embodiments, the beacon signal is a sound wave having, for example, an ultrasonic frequency. In one such embodiment, the beacon signal indicates to any remote within an approximate line-of-sight transmission space of the base station the information needed to establish bi-directional radio frequency communications between the base station and the remote.

In various embodiments, the beacon signal is a high power, short duration signal produced and transmitted by the base station. In various embodiments, the beacon signal includes a sufficient amount of power so as to provide a beacon signal having a sufficient signal strength to be detected by one or more remotes located anywhere within a enclosure where a source providing the beacon signal is located. In one such embodiment, the signal strength is chosen to limit detection of the beacon signal outside the enclosure.

In various embodiments, the base station producing and transmitting the beacon signal is powered from a line source rather than a battery source. This feature allows the high power beacon signal to be provided without the need for the large power requirement needed to produce the beacon signal being made on a battery operated device. In various embodiments, the remotes are operable so that the remotes receive the beacon signal transmitted at the line-of-sight transmission signal frequency, but transmit and receive information at a radio frequency. Since the radio frequency transmissions and receptions are low power operations compared to the transmissions of the beacon signals, such an approach enables efficient and long operating periods for the remotes using battery power.

In various embodiments, the beacon signal is used as a locator beacon signal in order to allow remotes to determine when they are in an area where bi-directional communications between a given remote and a given base station can be established, and to indicate the wavelength or wavelengths of radio frequencies the bi-directional communications can be established on.

FIG. 1 illustrates a system 100 according to various embodiments. In various embodiments, system 100 includes an amplifier 120 coupled to one or more devices and operable to receive inputs from the one or more devices, process the received inputs, and provide outputs to one or more devices. Devices include but are not limited to computer 122, digital video disk (DVD) player 124, camera 126, controller 130 and projector 132, speakers 150, and display 160. In various embodiments, display 160 is coupled to amplifier 120 through display driver 162, or does not require a display driver as indicated by dotted line 164.

Amplifier 120 is not limited to any particular type of amplifier. Amplifier 120 may include any amplifier capable of receiving inputs and processing the inputs to provide outputs. In various embodiments, amplifier 120 is operable to amplify received signals, including but not limited to audio signals, video signals, and control input signals. Control input signals are not limited to any particular type of signals, and include any type of signals including control information or data associated with any of the devices included in system 100.

In various embodiments, system 100 includes a base station 112. Base station 112 is not limited to any particular type of base station. In various embodiments, base station 112 is communicatively coupled to a remote 110, and is operable to provide both one-way beacon signals to remote 110, and to establish bi-directional communications between the base station 112 and the remote 110, as further described herein. In various embodiments, base station 112 includes one or a plurality of antenna 114 operable to transmit and receive signals to and from remote 110. In various embodiments, remote 110 and base station 112 are operable to establish bi-directional communications at a wavelength transmitted and received at the beacon signal frequency range, and to establish bi-directional communications at wavelength operating in a radio frequency range.

In various embodiments, base station 112 includes transmitter 118 operable to transmit a beacon signal. In various embodiments, the transmitted beacon signal is a line-of-sight transmission signal, wherein the transmitted beacon signal is transmitted into a line-of-sight transmission space surrounding base station 112. In various embodiments, the transmitter 118 is operable to transmit the beacon signal at a wavelength in the infrared frequency range. In some embodiments, transmitter 118 is a transceiver operable to both transmit and receive signal in the infrared frequency range. In various embodiments, transmitter 118 includes a transceiver operable to transmit and receive signals on a plurality of wavelengths in the radio frequency range.

The beacon signal is operable to be received by any remotes, such as but not limited to remote 110, and to provide remote 110 with information for establishing bi-directional communications between the remote 110 and the base station 112. In various embodiments, base station 112 and remote 110 are operable to perform the bi-directional communications between base station 112 and remote 110 at wavelengths in the radio frequency range. In various embodiments, base station 112 and remote 110 are operable to perform the bi-directional communications between base station 112 and remote 110 at wavelengths in the infrared frequency range Remote 110 is not limited to any particular type of device. In various embodiments, remote 110 is any device operable to receive the beacon signal transmitted from base station 112, and to establish bi-directional communications with the base station 112 based on information included in the beacon signal. In various embodiments, remote 110 is a battery powered device, and thus is portable and moveable relative to base station 112. In various embodiments, remote 110 is a hand held device that may be carried by a user, for example but not limited to a user being a teacher in a classroom, the classroom including base station 112. In various embodiments, remote 110 includes a microphone 111 coupled to remote 110. In various embodiments, microphone 111 is a small portable type microphone that may be attached to clothing worn by the user of remote 110 so that as the user speaks, microphone 111 receives the voice of the user, and converts the voice to a signal coupled to remote 110. In various embodiments, the signal representative of the voice is transmitted to base station 112, and in various embodiments is coupled to amplifier 120 and output to one or more output devices, such as speakers 150.

In various embodiments, remote 110 includes one or more input devices 115. Input devices 115 are not limited to any particular type of devices, and may include any type of device that provides an input to remote 110. In various embodiments, input devices 115 include pushbuttons. In various embodiments, input devices 115 may include a scroll wheel or a mouse button that is operable to be manipulated by a user to provide an input signal to remote 110. In various embodiments, input devices 115 include a touch pad or touch screen operable to allow a user to touch or otherwise manipulate the touch pad or touch screen to provide inputs to remote 110. In various embodiments, inputs to remote 110 are transmitted to base station 112 and are used as control signals to control one or more of the devices in system 100.

In various embodiments, remote 110 includes one or more output devices 113. Output devices 113 are not limed to any particular type of output device. In various embodiments, output devices 113 include a display. The display is not limited to any particular type of display, and may be a light emitting diode display, a liquid plasma display, or any other type of display operable to provide visually displayed information. In various embodiments, output devices 113 include a device, such as but not limited to a speaker, operable to provide an audio output. In various embodiments, output device 113 includes indication lights, such as but not limited to light emitting diodes, operable to provide visual indications to a user.

In would be understood that remote 110 is not limited to any particular number or combinations of input devices 112 and output devices 113, and may include one or more devices that function as both input and output devices. By way of illustration, remote 110 may include a touch screen that allows a user to manipulate a graphical symbol, such as but not limited to a cursor on the touch screen to provide an input signal, and the same display may provide an indication, such as number or a bar graph, indicating the present setting of the parameter manipulated by the touch screen input. In various embodiments, the parameter being manipulated by an input device 112 is a volume setting associated with a user's voice being received at microphone 111 and coupled through system 100 to an output device, such as but not limited to speakers 150 in system 100.

In various embodiments, system 100 includes a plurality of remotes, represented by dotted line 117 and remote 119. The number of remotes in system 100 is not limited to a particular number of remotes. The types of remotes in system 100 is not limited to any particular types of remotes, and is not limited to each of the remotes in system 100 being the same type of remotes. In various embodiments, remotes 117 through 119 include any or all of the features described herein with respect to remote 110.

In various embodiments where remote 110 is battery operated, system 100 includes charger 116. Charger 116 is not limited to any particular type of charger, and includes any type of charger operable to recharge the battery or batteries used in remote 110. In various embodiments, charger 116 is powered from a power source 170 through power lines 172 and power output 174. In various embodiments, power source 170 is the commercial power source provided to a building or structure in which system 100 is installed. In various embodiments, power source 170 provides electrical power at a nominal 120 volts alternating current as is typically provided in a residential, school, or commercial building in the United States. In various embodiments, charger 116 operates at a nominal voltage provided in a area where system 100 is installed outside the United States, such as but not limited to one or more countries in Europe.

In various embodiments, base station 112 is operable to receive power from and to operate using power supplied from output 174. In various embodiments, amplifier 120 is operable to receive power from and to operate using a power supplied from output 174. In various embodiments, output 174 is operable to provide power at a low voltage level. In some embodiments, the low voltage level is direct current (DC) power. In some embodiments, a low voltage level includes a voltage level of 42 (Underwriters Laboratory U.L. standard) volts or less. In some embodiments, a low voltage level includes a voltage level of approximately 12 volts.

Figure 2:
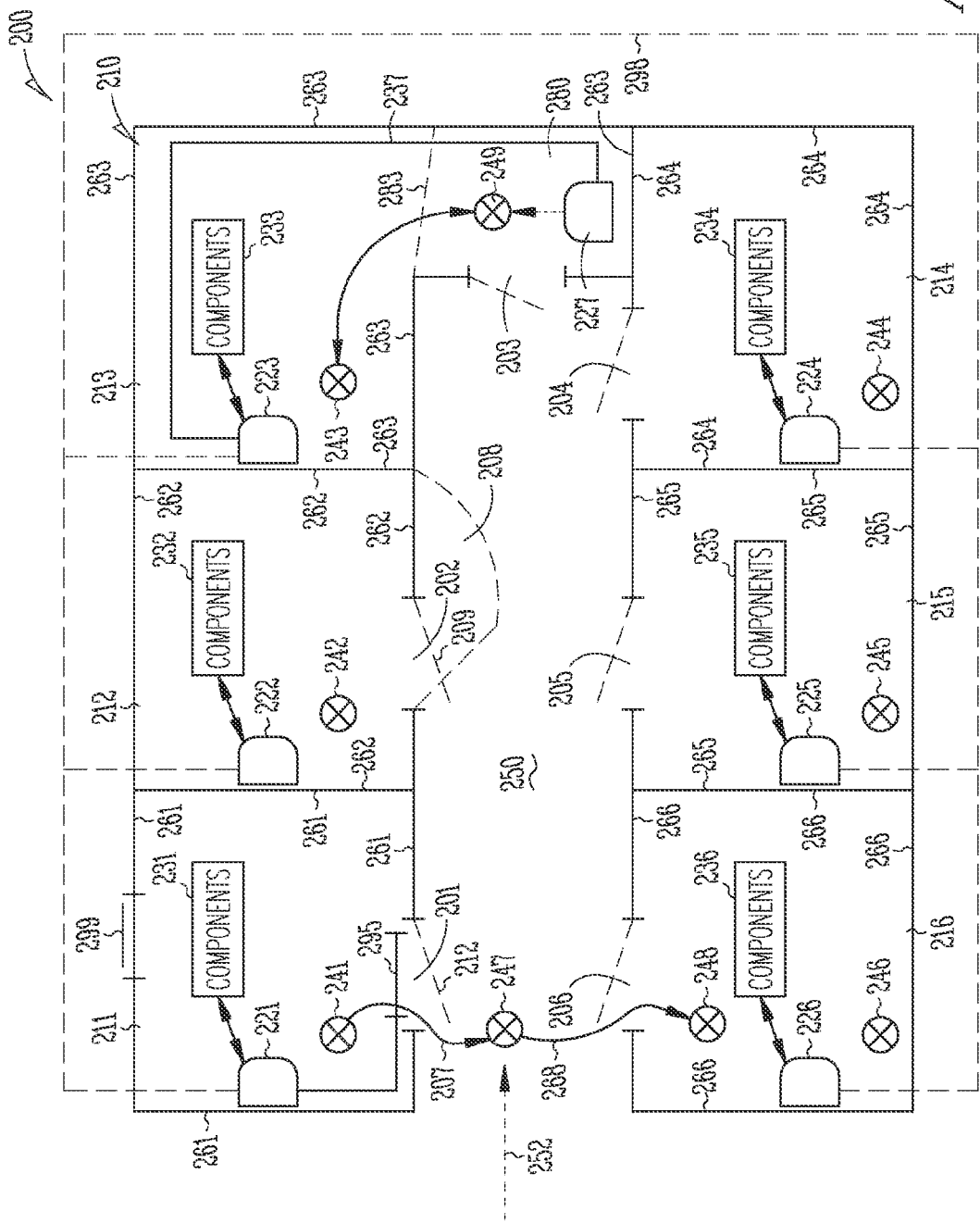
FIG. 2 illustrates a system according to various embodiments.

FIG. 2 illustrates a system 200 according to various embodiments. In various embodiments, system 200 is installed in a structure 210 including a plurality of adjacent rooms 211-216 operable to allow access and egress by personnel (personnel not shown in FIG. 2). In various embodiments, structure 210 is not necessarily limited to adjacent rooms that are physically connected or that are in a same building, but may include other buildings or other portable type classrooms where portions of system 200 are installed. In various embodiments, rooms 211-216 are adjacent to hallway 250, and include at least one route of access and egress, such as through openings 201-206 respectively, into and out of each of rooms 211-216 to hallway 250. In various embodiments, structure 210 and rooms 211-216 represent classrooms in a school. However, structure 210 and rooms 211-216 are not limited to any particular type of structure, and may include any type of structure were personnel access and egress, including but not limited to schools, churches, hospitals, and in some embodiments including vehicles, including but not limited to automobiles, buses, aircrafts, and boats.

In various embodiments, one or more of rooms 211-216 include a base station, illustrated by base stations 221-226. Base stations 221-226 are not limited to any particular type of base station, and may include base station 112 as described in regards to FIG. 1, and may include base station 700 as described in regards to FIG. 7. Base stations 221-226 are not limited to being the same types of base stations.

Referring again to FIG. 2, each of base stations 221-226 may be coupled to a separate set of components illustrated as components 231-236 respectively. Components 231-236 are not limited to any particular types of components. In various embodiments, components 231-236 include an amplifier, such as but not limited to amplifier 120 of FIG. 1. In various embodiments, components 231-236 include one or more devices such as but not limited to computer 122, camera 126, DVD 124, controller 130 and projector 132, speakers 150, and display 160, as illustrated in FIG. 1. Components 231-236 may include different combinations of devices within each set of components 231-236, and are not limited to having the same set of components within any given one of components 231-236.

In various embodiments, one or more of rooms 211-216 include a remote, illustrated as remotes 241-246. Remotes 241-246 are not limited to any particular type of remote, and may include any type of remote, such as but not limited to remote 110 as described in regards to FIG. 1. In various embodiments, remotes 241-246 are operable to receive a beacon signal from any one of base stations 221-226, and to establish bi-directional communications with the particular one of base stations 221-226 from which the beacon signal was received. In various embodiments, each of remotes 241-246 is operable to receive a beacon signal from one of base stations 221-226 under certain conditions as described herein, and to individually per remote establish bi-directional communications with any one of the base stations 221-226 from which a beacon signal is received. In various embodiments, because the beacon signals transmitted by any one of base stations 221-226 are line-of sight transmission signals, a given remote of remotes 241-246 would only be capable of being exposed to no more than one beacon signal for any given location within structure 210.

By way of illustration, remote 241 is within room 211, and so is only capable of being exposed to a beacon signal from base station 221 while remaining within room 211. Remote 241 cannot receive any beacon signals being transmitted by another base station, for instance base station 222, because the line-of-sight transmission signal used to transmit the beacon signal from base station 222 does not penetrate the enclosure 261 surrounding room 211. Further, the beacon signal from base station 222 does not penetrate outside enclosure 262 surrounding room 212.

In addition, other base stations 223-226 are also prevented from having any detectable beacon signal they are transmitting being able to reach remote 241 due to remote 241 being within room 211 and the surrounding enclosure 261. Further, since each of the base stations 223-226 are surrounded enclosures 263-266 respectively, any beacon signals they are transmitting are limited to being contained within the enclosures 263-266 respectively. Each enclosure 261-266 is operable to prevent the beacon signal from being transmitted beyond the area surrounded by the respective enclosures 261-266. In various embodiments, each of enclosures 261-266 surround an area defied by the walls, floors, and ceilings of rooms 211-216 respectively. Enclosures 261-266 are not limited to any particular type of enclosures, and include any type of enclosures that prevents the transmission and the penetration of the type of signal or channel media used by the base stations 221-226 to transmit their respective beacon signals.

In various embodiments, illustrative remote 241 will not receive the beacon signal from base station 221 when removed from enclosure 261, and when this occurs, remote 241 is operable to terminate any transmissions from remote 241 that were previously established as part of the bi-directional communications with base station 221. As illustrated in FIG. 2, when remote 241 is removed from enclosure 261, for instance through opening 201 as represented by arrow 207, remote 241 is operable to terminate any established bi-directional communications between remote 241 and base station 221. In various embodiments, this termination is based on a timeout at remote 241, wherein a time limit is exceeded for receiving a beacon signal from base station 221. In various embodiments, when remote 241 does not receive a beacon signal from base station 221 within a given time limit, remote 241 will terminate any established bi-directional communications between remote 241 and base station 221.

This feature prevents remote 241 from continuing to provide input signals, such as signals representing the audio inputs at a microphone coupled to remote 241, from being transmitted to base station 221. In such instances, a user having the remote 241 and exiting room 211 with remote 241 will no longer have their conversion transmitted to base station 221, and thus will no longer have to be concerned with any conversation they may be having, or any other activity they are engaged in, being overhead by anyone still within room 211. The termination of the transmission will occur automatically without any action being required by the user having the remote 241. This feature is advantageous for instance where a teacher using a microphone and a remote to speak to a class in room 211 steps out to the room for any reason, including to talk to another person or to another student privately. In such instances, the conversation, or any other activity the teacher is engaged in, is not inadvertently made available to the students remaining in the room.

In various embodiments, removing remote 241 from room 211 is illustrated by remote 247, wherein remote 247 is shown as being in hallway 250 and thus is outside enclosure 261. In various embodiments, remote 247 represents another remote besides remote 241 that enters hallway 250 from an area outside hallway 250, as illustrated by arrow 252.

In various embodiments, a remote such as remote 247 (which may be remote 241 as removed from room 211 or another remote from outside) may be brought into another enclosure 266 representing an enclosure surrounding room 216, which is a different enclosure and room from enclosure 261 and room 211 respectively. Upon bring the remote into enclosure 266 as illustrated by arrow 268 and remote 248, remote 248 may receive a beacon signal from base station 226, and based on information included in the beacon signal from base station 226, establish bi-directional communications with base station 226. In various embodiments, remote 248 establishes bi-directional communications with base station 226 even when another remote 246 is already present and has established bi-directional communications with base station 226. In various embodiments, where remote 248 is the same as remote 241, the remote 241 terminated bi-directional communications with base station 221 when removed from enclosure 261 to hallway 250, and established bi-directional communications with base station 226 when moved from hallway 250 into enclosure 266. In various embodiments, remote 247 from outside hallway 250 establishes bi-directional communications with base station 226 when moved from hallway 250 to enclosure 266.

Because the beacons signal for any given one of base stations 221-226 is limited to a line-of-sight transmission within rooms 211-216 respectively, every one or more, or all, of base stations 221-226 can transmit the beacon signal on a same frequency without interfering with the beacon signals of any other base station. In that way, a given remote can receive any beacon signal from any base station at a known and same frequency, and thus can move between rooms 211-216 while knowing which frequency a beacon signal, if present, would be found on in any one of the rooms 211-216. This feature allows remotes 241-248 to move between rooms 211-216 and detect a beacon signal in any of rooms on a same frequency. Remotes 241-248 only need to be operable to detect the single frequency to detect all beacons signals from base stations 221-226, thereby simplifying the required circuitry in both the base stations and the remotes, and eliminated the need to reprogram remotes for each room where they are intended to operate.

In embodiments where two remote devices have established bi-directional communication with a same base station, any arbitration mechanism may be used to arbitrate the use of the signals received from the remotes at the base station. In some embodiments, wherein both remotes that have established the bi-directional communication have microphones coupled to the remotes, a first-to-speak arbitration scheme may be used wherein the first remote to provide audio input as part of the bi-directional communication. to the base station is given priority and is processed to an output from base station for as long as the audio input continues, and when the audio input ends, the second remote may then gain access to the outputs from the base station by providing audio input on its bi-directional communications with the base station. In various embodiments, the audio signals from both of remotes 246 and 248 are provided simultaneously to base station, and are both mixed and provided as an output from the base station.

In various embodiments, the frequency used to transmit the beacon signals is a pre-determined standard frequency. By way of illustration, industrial standards may exist in different countries for the use of infrared frequencies in order to enable compatibility of devices sold for operation in these countries. However, these requirements may not be jurisdictionally dictated by the governmental or regulatory agency having jurisdiction in the region, area or country where system 200 is being operated.

By way of illustration, industrial standards for devices transmitting and receiving electromagnetic signals with wavelengths in the infrared frequency range may operate at standardized frequencies of 28, 32, 36, 38, 40, 56 and 455 kilohertz. The 28, 32, 36, 38, 40, and 56 kilohertz frequencies are typically used in the United States, while the 455 kilohertz frequency is typically used in Europe. However, these standards are not required by the judiciary or regulatory bodies having regulatory authority in these countries. Therefore, a device may operate on any of these, or different wavelengths, within the infrared range of frequencies. Thus, use of infrared wavelength transmissions may not be restricted to or limited to only the frequencies depicted by the standards, and thus transmissions on frequencies, such as other infrared frequencies, that are different from the frequencies of the standards for the area where system 200 is installed would not violate the jurisdictional regulations.

By operating the beacon signals in one of these industrial standard frequency ranges, in various embodiments base stations, 221-226 can use one or more commercially available off-the-shelf circuits for use in generating and transmitting the beacons signals. In various embodiments, remotes 241-248 use one or more commercially available off-the-shelf circuits to receive and process the beacon signals. In various embodiments, base stations 221-226 and remotes 241-248 are operable to use a standard frequency for the beacon signal that is a standard dicited by a different standard generally used in a country or region in which the base stations 221-226 and remotes 241-248 are operated, but in a manner that does not violate any of the jurisdictional regulation of the country or region in which the base stations 221-226 and remotes 241-248 are intended to operated. By way of illustration, a system 200 intend to operate in the United States is designed to have base stations 221-226 operate at a standard frequencies designated for use in another jurisdiction, for example Europe. By using a standard frequency from Europe, base stations 221-246 and remotes 241-248 can still be built using commercially available off-the-shelf circuits, that include circuits intended for European use, while at the same time minimizing the chance of interfere with other devices that may be used in proximity to base stations 221-226 and remotes 241-246, such as a wireless mouse, a wireless keyboard, a television remote control, or a wireless hand held device such as a personal digital assistant (PDAs). Since these devices are most likely operating on the frequency of the standards used in the Unites States, use of the European standard frequency minimized the change of interfering with the other devices while still not violating any jurisdictionally dictated regulations and still allowing the use of commercially available off-the-shelf parts.

In various embodiments, bi-directional communications include transmitting and receiving wavelengths having frequencies within the range of radio frequency signals. Radio frequencies have a wide range of wavelengths. Jurisdictionally determined radio frequency standards include frequency assignments dictated by a governmental or regulatory agencies having authority to assignee and regulate transmission of signals in a designated area, region, or country. For example, in the United States the Federal Communications Commissions FCC was established by the Communications Act of 1934 as the successor to the Federal Radio Commission and is charged with regulating all non-Federal Government use of the radio spectrum (including radio and television broadcasting), and all interstate telecommunications (wire, satellite and cable) as well as all international communications that originate or terminate in the United States. The FCC's jurisdiction covers the 50 states, the District of Columbia, and U.S. possessions.

In various embodiments, each base station is operable to establish bi-directional communications on any one of a plurality of channels within a range of radio frequencies. In various embodiments, each base station is operable to establish bi-directional communications on any one of a standard channel designed by some recognized standard. In various embodiments, each base station is operable to establish bi-directional communications on any of the ninety-eight channels having wavelengths in the frequency range between 2.400 gigahertz and 2.498 gigahertz.

At any given time, by having only one of base stations 221-226 operate on any given one of the plurality of different channels, there is no or little interference between the base stations and remotes operating in different rooms. Because each base station is operable to establish bi-direction communications with a remote using a different frequency or channel within a range of radio frequencies, each room 211-216 is operable to transmit radio frequency signals that are not necessarily limited to being contained in the respective enclosures 261-266, and yet will not interfere with one another because the base stations 221-226 are operating on these different frequencies or channels.

In various embodiments, each of base stations 221-226 are programmably settable to transmit its bi-directional communications power level to one or more different power settings. Setting of power levels for the transmissions from the base stations limits the range of the transmissions, and in some embodiments helps eliminate interference between base station operating in relative close proximity on channels close to one and other within the frequency range used for the bi-directional communications. In some embodiments, one or more base stations 221-226 that are located far enough apart so that they may use a same frequency or channel for bi-directional communications by adjusting the power settings for the base stations' transmissions of the bi-directional communications to level that eliminations or minimizes the interference between two base stations operating on the same frequency or channel.

In system 200, any of remotes 241-248 may be moved from and moved into any one of rooms 211-216, and will automatically without requiring any action on the part of the user having the remote, establish bi-directional communications with the base station located in the room into which the remote has been moved. In addition, each remote, when removed from any of rooms 211-216, with automatically, without requiring any action on the part of the user having the remote, terminating the bi-directional communications with any based station in a room from which the remote has been removed.

In various embodiments, walls not adjacent to another room in structure 210 do not need to block the beacon signal, as any signal penetrating the non-adjacent wall would not present a line-of-sight path to any remotes in the other rooms. By way of illustration, room 211 includes portion 299 that may not block the beacon signal transmitted from base station 221. However, since any signals exiting room 211 through portion 299 would be directed to an area outside structure 210, the beacon signal in this area would not be received by any remotes within structure 210. In various embodiments, portion 299 is a glass window. In various embodiments, portion 299 allows some penetration of the beacon signal, but only an attenuated level of signal penetrates portion 299. In some embodiments, the attenuated beacon signal is not of adequate signal strength to be received and recognized as a beacon signal by any of remotes 241-248. In addition, a opening for access and egress may allow a limited reception areas outside the enclosure where a beacon signal may exist. By way of illustration, room 212 includes opening 202 that in some instances allows a beacon signal to reach area 208. However, area 208 would be reduced by or eliminated by such obstructions as door 209. Further, any beacon signal from base station 222 in room 212 is mot likely not going to have a line-of-sight path to any remotes in any other rooms 211 and 213-216, and so would not be able to interfere with remotes in these rooms. In various embodiments, a base station, such as base station 222, is positioned within the room in which it is installed, such as room 212, in order to minimize the line-of-sight path to any areas outside the room. In various embodiments, a power setting adjustment is made to a base station in order to minimize the amount and power level of any beacon signals from the base station that reach outside the room in which the base station is installed.

In various embodiments, system 200 includes a network 298 coupling the base stations 221-226. Network 298 is not limited to any particular type of network or networks, and may include any type of network or networks operable to couple base stations 221-226. In various embodiments, network 298 is operable to allow any one of base stations 221-226 to be programmed, including providing programming of power settings for the transmission levels of the bi-directional communications from the base stations. In various embodiments, network 298 allows base stations 221-226 to be programmed with a frequency or a channel to be used for transmissions of the beacon signal. In various embodiments, network 298 is used to monitor the status of one or more base stations 221-226. In various embodiments, network 298 is operable to turn on and to turn off any one or more, or all of base stations 221-226.

In various embodiments, when a base station is first powered or is otherwise first activated, the base station first scans each of the frequencies or channels the base station is operable to establish bi-directional communications on. Scanning includes monitoring any one or more or all of the frequencies or channels to receive any communications that might be occurring on these frequencies or channels. During the scanning, the base station that is performing the scanning does not transmit any signals on any of the frequencies or channels within the range of frequencies that includes these channels. During the scanning, the base station performing the scanning will detect any received bi-directional communications being transmitted on the channels being scanned. The base station is operable to determine a frequency or a channel where there is no bi-directional communications being received at the base station, and is operable to select that frequency or that channel having no or only non-interfering levels of detected communications as the frequency or channel the base station will operate on when it establishes any bi-directional communications. Once the frequency or channel is selected, the base station will begin transmitting a beacon signal, the beacon signal to include at least one information portion including information indicating the frequency or the channel the base station has selected for bi-directional communications.

In various embodiments, a follower base station 227 is included in a room. A follower base station is a base station that is coupled to another base station and mimics one or more of the settings, transmissions, and operating parameters of the base station to which it is coupled. In various embodiments, follower base stations are used where a single base station will not be capable of covering with its beacon signal the entire enclosure where the single base station is to be installed due to line-of-sight obstructions. By way of illustration, room 213 includes base station 223 which would be able to transmit a beacon signal having an approximate line-of-sight transmission space, and have its beacon signal received by remote 243. However, remote 249 in room 213 is located in area 280 that is outside the limit 283 of a beacon signal transmitted as an line-of-sight transmission signal from base station 223, and so remote 249 may not have reception of the beacon signal being transmitted by base station 223. By using follower base station 227, and having follower base station 227 mimic the beacon signal transmitted from base station 223, remote 249, and other remotes in area 280 located within room 213, will be covered by a beacon signal from at least one, or both, of base stations 223 and 227. In various embodiments, remote 249 represents remote 243 as remote 243 moves to a different location within room 213.

In various embodiments, a beacon curtain 295 is provided within an enclosure, such as enclosure 261 in room 211. The beacon curtain transmits a beacon curtain signal in a narrow and focused range. The beacon curtain signal is operable to transmit a signal to a remote that turns the remote on when a remote passes through the beacon curtain 295, and turns the remote off when the remote when the remote again passes through the beacon curtain 295. By way of illustration, beacon curtain 295 is installed in doorway over opening 201, and is coupled to base station 221. Beacon curtain 295 is operable to provide a focused beacon signal operable to turn on remote 241, or any other remote, that enters room 211, an to turn off remote 241, or any other remote, when the remote leaves room 211.

Figure 3:
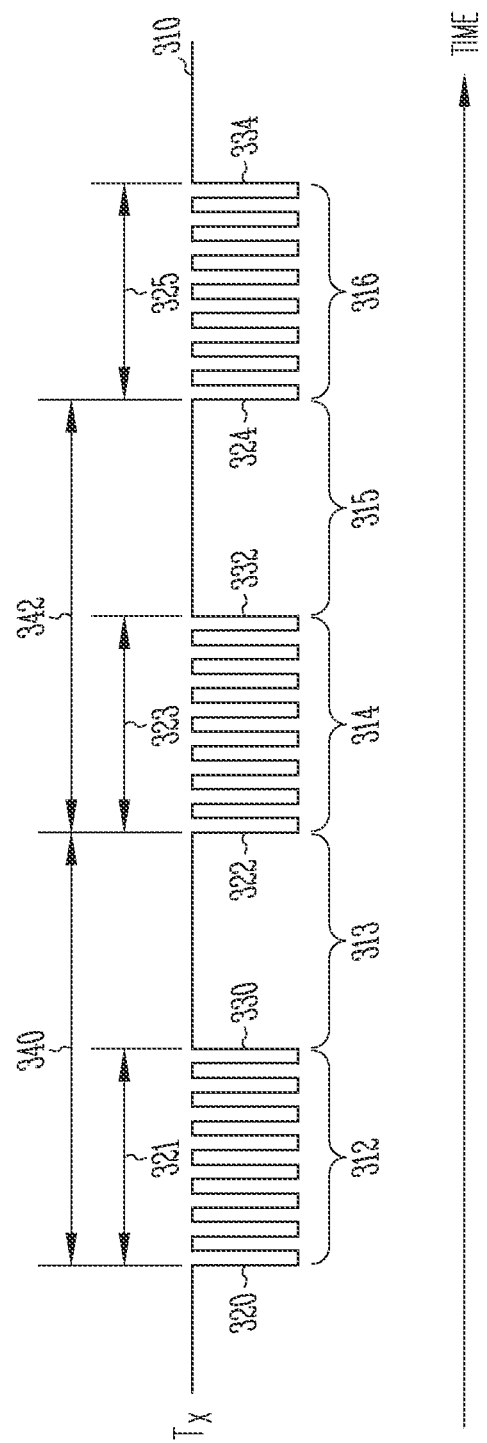
FIG. 3 illustrates a beacon signal according to various embodiments.

FIG. 3 illustrates a beacon signal 300 according to various embodiments. In various embodiments, beacon signal 300 is a signal generated by and transmitted from a base station, such as but not limited to base station 112 in FIG. 1, or any one of base stations 221-226 in FIG. 2, or base station 700 in FIG. 7. In various embodiments, beacon signal 300 is a line-of-sight transmission signal as described herein. In various embodiments, beacon signal 300 includes waveform 310 including at least one information portion including an indication of a frequency or channel on which the base station providing the beacon signal 300 has selected for bi-directional communications.

In various embodiments, waveform 310 includes a plurality of pulses 312, 314, and 316 separated by time periods 313 and 315. Pulse 312 includes a leading edge 320 and a trailing edge 330 following the leading edge after time period 321. Pulse 314 includes a leading edge 322 following trailing edge 330 after time period 313. Pulse 314 includes a trailing edge 332 following the leading edge 322 after time period 323. Pulse 316 includes a leading edge 324 following the trailing edge 332 after time period 315. Pulse 316 includes a trailing edge 334 following leading edge 324 after a time period 315.

In various embodiments, during the time included within each of pulses 312, 314, and 316, waveform 310 changes between different signal levels to create a series of pulses at a given frequency. In various embodiments, the given frequency is not limited to any particular frequency, and includes any non-radio frequency used to modulate the beacon signal during each of pulses 312, 314, and 316. In various embodiments, the given frequency is an infrared frequency. In various embodiments, the given frequency is 455 kilohertz.

In various embodiments, the time interval included in time period 321 indicates information indicating the frequency or channel a base station providing waveform 310 has selected for use in its bi-directional communications. By setting the time interval included in time period 321 to different time internals depending on which frequency or channel the base station has selected of use in its bi-directional communications, a beacon signal including waveform 310 provides information related to the selected frequency or channel to a remote receiving the beacon signal including waveform 310. In various embodiments, each of pulses 312, 314, and 316 are all the same time periods 321, 323, and 325 respectively, and thus redundantly provide the same frequency or channel information within waveform 310.

In various embodiments, the time period 340 between leading edges of pulses 312 and 314 in waveform 310 represents information indicating the frequency or channel a base station providing the beacon signal 300 has selected for use in its bi-directional communications. Different time periods for time period 340 are used to represent different frequencies or channels for which a base station is operable to establish bi-directional communications. By proving a given time period for time period 340 as part of a beacon signal, a base station providing the beacon signal can indiction the frequency or channel on which the base station is operable to establish bi-directional communications. The bi-directional communications are on a different frequency or channel from the frequency on which the beacon signal is provided. By varying the time period 340 depending on the frequency or channel selected for bi-directional communications, a device such as a remote can measure time period 340, and determine a frequency or channel the base station has selected and is operable to use for performing bi-directional communications. In various embodiments, the next successive time period 342 between leading edges 322 and 324 includes a same time period as time period 340, and can be used as a redundant check of the time period measured for time period 340. In various embodiments, waveform 310 includes a continuous stream of subsequent pulses having leading edges at a time period approximately equal to time period 340. In various embodiments, leading edges for a given pulse 312, 314, and 316 are determined by having a minimum time, such as time period 313 before leading edge 322, during which the state or level of waveform 310 is unchanging.

In various embodiments, the frequency or channel information provided by time period 340 is redundant to the frequency or channel information provided within any of pulses 312, 314, and 316 by time periods 321, 323, and 325 respectively. In various embodiments, the frequency or channel information provided by time period 340 is a different frequency or channel that is indicated by the information within any of pulses 312, 314, and 316 and time periods 321, 323, and 325.

In various embodiments, the time periods 321, 323, and 325 for any one of pulses 312, 314, and 316 respectively is a fraction of the time periods 313 and 315 between these pulses, and so the time line in FIG. 3 is not evenly scaled along the length of the time line. Time periods 321, 323, and 325 are not limited to any particular time intervals. In various embodiments, time periods 321, 323, and 325 are approximately 125 microseconds. Time periods 313 and 315 are not limited to any particular time periods. In various embodiments, time periods 331 and 315 are approximately 100 microseconds. In various embodiments, the time periods for one or more of time periods 321, 323, and 325 are different time periods. In various embodiments, the time periods for 313 and 315 are different time periods.

In various embodiments, signals within a given time period 340 or 342 represent information indicating the frequency or channel selected for bi-directional communications by the base station providing the beacon signal. The format of the information within a given time period 340 or 342 is not limited to any particular format, as further illustrated with respect to FIGS. 4A-C. In various embodiments, the information within any of time periods 340 or 342 is redundant to the information included in waveform 310 related to time periods 340 and 342. In various embodiments, the information within any of time period 340 and 342 represents information related to a different frequency or channel from the frequency or channel indicated by the information including by the length of time periods 340 and 342. By using two or more different types of information to indicate more than one channel, a beacon signal may include information indicative of more than a single frequency or channel to remotes.

Figure 4A:
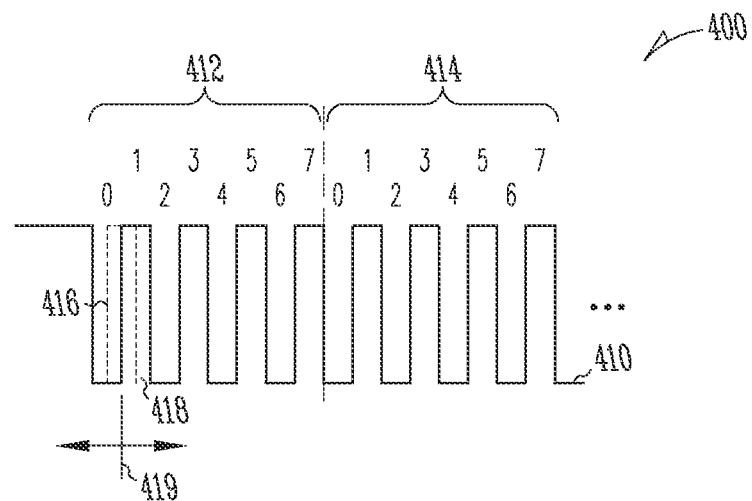
FIGS. 4A-C illustrate waveforms included in beacon signals according to various embodiments.
Figure 4B:
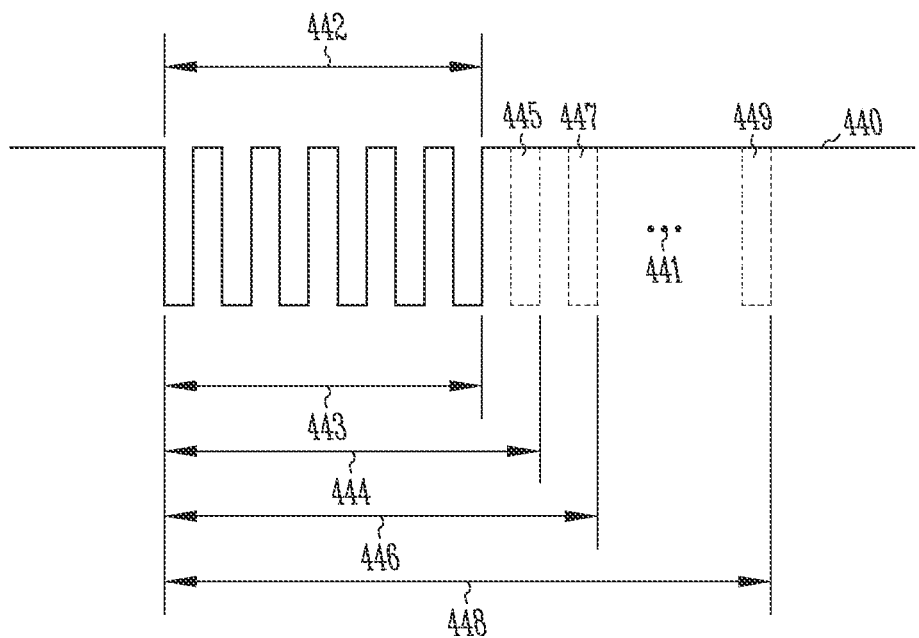
Figure 4C:
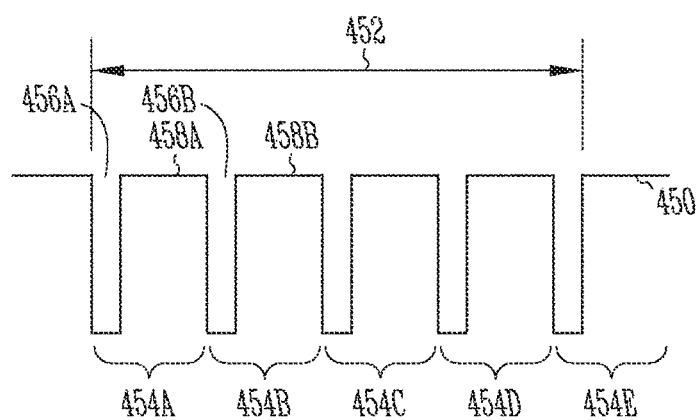

FIGS. 4A-4C illustrate various embodiments of waveforms 400 included within a beacon signal.

FIG. 4A includes waveform 410 including illustrative pulse sequences 412 and 414. In various embodiments, waveform 410 includes a continuous sequence of subsequent pulse sequences 412 and 414. In various embodiments, pulse sequence 412 is the same pulse sequence as pulse sequence 414. In various embodiments, pulse sequence 412 includes a plurality of data bits indicated by the individual pulses "0," "1," "2," "3," "4," "5," "6," and "7" as labeled in pulse sequence 412. For each of the individual pulses within pulse 412, a duty cycle of the pulse can be varied in order to indicate a first data value or a second data value. By way of illustration, individual pulse "0" within pulse sequence 412 can have a transition at 416, or a transition at 418, as indicated by the line and arrows 419. A transition at 416 is used to indicate a first data value, and a transition at 418 is used to indicate a second data value. By determining which of transitions 416 or 418 is included in individual pulse "0" a data value can be indicated by individual pulse "0." By using a same variable transition scheme for all in the individual pulses within pulse sequence 412, each individual pulse can be set to indicate a particular data value, and thus the individual pulses within pulse 412 are use to represent a byte (8-bits) of data. A data byte can represent 256 different values. In various embodiments, any number of these possible values can be used to indicate information regarding a frequency or a channel selected by a base station providing waveform 410 for establishing bi-directional communications with the base station.

In various embodiments, pulse sequence 414 includes a plurality of data bits indicated by the individual pulses "0," "1," "2," "3," "4," "5," "6," and "7" pulses as shown in pulse sequence 414. Like pulse sequence 412, pulse sequence 414 is used to indicate a byte of data. In various embodiments, pulse sequence 414 is the same data as in pulse sequence 412, and waveform 410 is a continuous sequence of the same pulse sequences 412 and 414. In various embodiments, pulse sequence 414 is a second data byte included in waveform 410 to be used in conjunction with pulse sequence 412 to form a 16-bit data word. In various embodiments, The 16-bit data word is repeated in a continuous pattern a number of times in waveform 410 as indicated by the dotted line 417 to the right of pulse sequence 414. In various embodiments, each individual pulse within pulse sequence 412 and 414 represent the pulses included in time interval 340 and time interval 342 in FIG. 3. It would be understood that any number of data bits could be included in the data represented by a pulse sequence such as pulse sequences 412 and 414.

Figure 7:
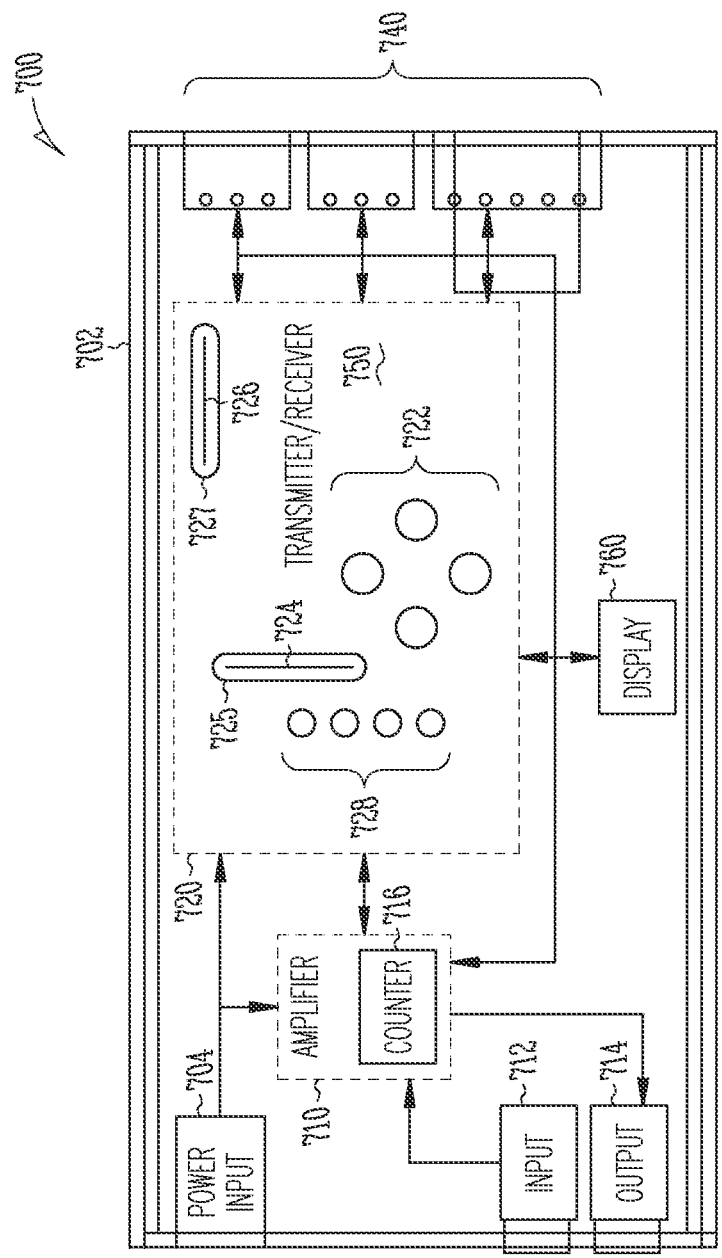
FIG. 7 illustrates a base station according to various embodiments.

Waveform 410 is not limited to any particular type of signal levels. In various embodiments, waveform 410 is digital data level signals. In various embodiments, waveform 410 is provided as any level of signals that may be used by a base station to provide frequency or channel information to remotes, such as but not limited to the base stations and remotes as shown in FIG. 1, FIG. 2, and FIG. 7.

FIG. 4B includes waveform 440 including a sequence of pulses 442. The number of pulses in the sequence of pulses 442 is not limited to any particular number of pulses. In various embodiments, a time interval 443 between the first transition in the sequence of pulses 442 and the last transition in the sequences of pulses 442 is an indication of a frequency or a channel selected by a base station providing waveform 440 for establishing bi-directional communications with the base station. In various embodiments, waveform 440 includes the sequence of pulses 442 plus an additional pulse 445. In embodiments including the additional pulse 445, the time interval 444 between the first transition in the sequence of pulses 442 and the last transition of pulse 445 is a time interval different from time interval 443. In various embodiments, the different time interval of 444 is used to indicate a different frequency or channel selected by a base station providing waveform 440 for establishing bi-directional communications with the base station. In various embodiments, any number of additional pulses 447 through 449, as indicate by dotted line 449, may be added to indicate providing different time intervals 446 through 448, the different time intervals indicative of different frequencies or channels selected by the base station providing waveform 440 for establishing bi-directional communications with the base station. In various embodiments, all of the pulses depicted in waveform 440 are the individual pulses included within an burst during a time interval such as but not limited to pulse 312 in FIG. 3.

Waveform 440 is not limited to any particular type of signal levels. In various embodiments, waveform 440 is digital data level signals. In various embodiments, waveform 440 is provided as any level of signals that may be used by a base station to provide frequency or channel information to remotes, such as but not limited to the base stations and remotes as shown in FIG. 1, FIG. 2, and FIG. 7.

FIG. 4C includes waveform 450 including a sequence of pulses 454A-E. In various embodiments, waveform 450 includes a continuous sequence of subsequent pulses as illustrated by pulses 454A-E. Referring to pulse 454A, the pulse includes a first portion 456A, and a second portion 458A. The duty cycle time comparing the time of the first portion 456A and the time of the second portion 458A can be used to indicate a frequency or channel selected by the base station providing waveform 450 for establishing bi-directional communications with the base station. In various embodiments, each different duty cycle within pulse 454A indicates a different frequency or channel selected by the base station providing waveform 450. In various embodiments, each subsequent pulse 454B-E includes a same duty cycle as included in pulse 454A, and thus provides redundant information to the indication included in pulse 454A. In various embodiments, each of pulses 454A-E represents a burst and an off time as included in time interval 340 of waveform 310 in FIG. 3.

Waveform 450 is not limited to any particular type of signal levels. In various embodiments, waveform 450 is digital data level signals. In various embodiments, waveform 450 is provided as any level of signals that may be used by a base station to provide frequency or channel information to remotes, such as but not limited to the base stations and remotes as shown in FIG. 1, FIG. 2, and FIG. 7.

It should be understood that FIGS. 4A-4C are illustrative of types of waveforms that are usable as part of beacon signals as described herein. However, embodiments of beacon signals are not limited to the types of waveforms illustrated in FIGS. 4A-4C. Embodiments, may include any type of waveforms operable to provide channel information in a beacon signal. Various embodiments may combine two or more types of signals, such as but not limited to those shown in FIGS. 4A-4C, in order to provide channeled information in a beacon signal. In various embodiments including a combination of two or more types of signals, the information may be redundantly included in each of the types of signals. Any possible combination of techniques for providing channel information may be included in the beacon signals of the various embodiments described herein.

FIG. 5 illustrates waveforms 500, including waveforms 510, 530, and 550. Waveform 510 includes a waveform representative of a beacon signal that is transmitted from a base station. Waveform 510 includes pulses 511, 512, 514, 516, 518, 520, and 524 occurring at a time interval 522. Based on at least the time interval 522, a remote receiving waveform 510 is operable determine the frequency or channel on which the base station providing waveform 510 has selected and is operable to perform bi-directional communications.

Waveform 530 represents a waveform of a beacon signal as received at a remote. Waveform 530 includes pulses 532, 534, and 536. Prior to pulse 532 during time period 531, although pulse 511 is transmitted, no pulses are received at the remote, and so the remote is off as depicted by the low level of waveform 550 during time period 551. Pulse 532 in waveform 530 represents receiving a pulse 512 from a base station at the remote. At time 552, waveform 550 changes to the on level, as represent by the change of state in waveform 550 at time 552. In various embodiments, based on the time period of pulse 532, the remote receiving the beacon signal may determine the indication of the frequency or channel selected by the base station providing waveform 510 for use in bi-directional communications. In various embodiments, the remote may delay beginning bi-directional communications until at least a second and redundant indication of the selected frequency or channel has been received and confirmed.

A second pulse 534 is received at the remote as represented in waveform 530. At time 554, the remote is operable to determine the time 553 between pulses 532 and 534, and from time 553 is operable to determine the frequency or channel the base station providing waveform 510 has selected for bi-directional communications. After time 544, and once the remote has determined which frequency or channel the base station providing waveform 510 has selected for bi-directional communications, the remote can begin bi-directional communications with the base station providing waveform 510 using the determined frequency or channel.

In various embodiments, following receiving a pulse in a beacon signal, the remote will begin a watchdog timer that will time out at some time period longer than the time interval 522 between the pulses in waveform 510, but that is reset each time a pulse is received at the remote. By way of illustration, for pulse 532, the remote will begin a watchdog timer that will time out at time 562 as shown in waveform 550. However, the watchdog timer is reset by pulse 534 in waveform 530. As a result of receiving pulse 534 at the remote, the watchdog timer will again begin the watchdog timer so as to time out at time 564 as shown in waveform 550. However, the watchdog timer is again reset by pulse 536. As long as the remote's watchdog timer is reset by another received pulse, the remote will remain on, as illustrated by time period 555 in waveform 550. However, as shown in waveform 530, pulse 536 is the last pulse received at the remote, and so after time period 557, the remote's watchdog timer will have timed out, and the remote will turn off, as indicated by the transition 560 in waveform 550. In various embodiments, since the pulses in a beacon signal from a base station will only be received by a remote when the remote is within an approximate line-of sight transmission space of the base station, the reception of pulses received by a remote will occur when a remote is brought into this approximate line-of sight transmission space, and will no longer be received at the remote when the remote is removed from any approximate line-of sight transmission space of the base station. Thus, as illustrated by waveform 550, a remote can be operable to automatically turn on upon receiving a beacon signal including pulses from a base station, and can be operable to automatically turn off when the beacon signal including pulses is no longer being received at the remote. Further, upon receiving the pulses, the remote is operable to determine a frequency or a channel on which to establish bi-directional communications with the base station for which the pulses are being received.

In various embodiments, receiving or not receiving the beacon signal including pulses provides a way to automatically turn on and turn off a remote when the remote enters and leaves respectively an approximate line-of-sight transmission space of an enclosure where a base station is located and where the base station is transmitting a beacon signal.

FIGS. 6A and 6B illustrate embodiments of a remote 600. Remote 600 is not limited to any particular type of remote, and may be remote 110 and additional remotes 117 through 119 as shown in FIG. 1, and may include any one or more of the remotes 241-248 as shown in FIG. 2.

FIG. 6A includes remote 600 having a case 602, and at least one transceiver 626. In various embodiments, remote 600 includes a handle area 604. Handle area 604 allows remote 600 to be hand held by a user. In various embodiments, case 602 includes an end area 630, wherein at least the end area 630 is formed of a transmissive material. A transmissive material is a material that is transmissive of the wavelengths of radio frequencies used by the remote to communicate with a base stations, and is also transmissive of the wavelengths of the signals provided as a beacon signal from a base station. In various embodiments, the transmissive material is composite of acrylonitrile butadiene styrene (ABS) plastic with a percentage of an infrared fill material. In various embodiments the transmissive material is a composite of acrylic plastic with a percentage of infrared fill material.

In various embodiments, transmissive material is transmissive of wavelengths of radio frequencies operating in the gigahertz range, and is also transmissive of wavelengths at infrared frequencies, including wavelengths operating at or near 870 nanometers. Transmissive material is material that does not attenuate to any significant amount the signal passing through the material.

In various embodiments, since at least end area 630 is transmissive of both the frequencies used for the beacon signals and the frequencies used for the bi-directional communications, no opening related to the transmission and reception of these signals is required in end areas 630, or in any other potion of case 602. The feature of not requiring opening reduces the cost of manufacturing the case 602.

In various embodiments, remote 600 includes one or more microphones, such as microphone 650, coupled to remote 600. In various embodiments, remote 600 includes a build-in microphone 660. In various embodiments, built-in microphone 660 is located in an end location of remote 600, as further illustrated in FIG. 6B. Referring again to FIG. 6A, in various embodiments remote 600 includes the remote microphone 650. In various embodiments, remote microphone 650 is coupled to remote 600 through a physical coupling 656. Physical coupling 656 is not limited to any particular type of physical coupling, and may include a plurality of physical conductors, or any type of transmission line operable to transmit signals between microphone 650 and remote 600. In various embodiments, power is provided to remote microphone 650 through physical connection 656. In various embodiments, remote 600 includes input 628 to couple physical connection 656 with remote 600.

In various embodiments, remote microphone 650 is coupled to remote 600 though a wireless channel 654. Wireless channel 654 is not limited to any particular type of wireless channel, and may include any type of wireless channel operable to allow remote microphone 650 to be communicatively coupled to remote 600. In various embodiments, microphone 650 is battery powered from a battery (not shown in FIG. 6A) included within remote microphone 650. In various embodiments, remote microphone 650 includes an attachment device 652 to allow the remote microphone 650 to be attached or held in an area close to a source of sound, such as but not limited to a user's voice. By way of illustration, remote microphone 650 includes a clip that would allow a user to attach remote microphone 650 to the user's clothing in the area near the user's mouth in order to allow remote microphone 650 to better receive the user's voice.

In various embodiments, the entire case 602, with the possible exceptions of one or more of actuatable devices 606A-E and output device 640, are formed of the transmissive material.

FIG. 6B illustrates an end view of remote 600, including case 602 and end area 630. Transceiver 626 is shown included within case 602 of remote 600. In various embodiments, end areas 630 does not include or require any openings in case 602 in order to allow reception and transmission of any of the signal received at and transmitted from remote 600. In various embodiments, end area 630 includes one opening 670, or a plurality of openings 670 and 671. Openings 670 and 671, if present in end area 630, provide openings for allowing a beacon signal including a sound wave to enter and be detected by remote 600.

In various embodiments, end area 630 includes built-in microphone 660 as described herein. In various embodiments, end area 630 includes one or more indicators 662 and 664. Indicators 662 and 664 are not limited to any particular type of indicator, and includes any type of indicator providing information to a user. In various embodiments, one or more of indicators 662 and 664 are light emitting diodes. In various embodiments, indicators 662 and 664 include an indiction, such as but not limited to a light emitting diode, capable of providing more than one color light indication used to represent different states. In various embodiments, at least one of indicators 662 and 664 include a battery indicator for indicating to a user the state of a battery in remote 600. In various embodiments, at least one of the indicators 662 and 664 indicate the state of the battery using a first color to indicate a battery charged to within a power operating range, and a second color to indicate a low or inoperable battery. In various embodiments, at least one of indicators 662 and 664 are used to indicate a state of the battery providing a visual indiction that a battery in remote 600 is approaching a discharged or low charge state. In various embodiments, the indication of a approaching discharge or low charge state includes a flashing on and off of at least one of indicators 662 and 664. In various embodiments, the indication of an approaching discharge or low charge state includes a particular color indication provided by at least one of indicators 662 and 664.

In various embodiments, at least one of indicators 662 and 664 include an indication of whether the remote 600 has or has not currently established bi-directional communications with a base station. In various embodiments, at least one of indicators 662 and 664 are operable to provide a visual indication of whether a beacon signal is or is not being received within the timeout period for receiving a beacon signal for the remote 600. In various embodiments, any of the indicators 662 and 664 use any of the type of indications including but not limited to visual color or flashing indications as described herein. Embodiments of remote 600 are not limited to having a particular number of indicators 662 and 664, and may include more or less indicators, including having no indicators on end area 630.

In various embodiments, one or more of indicators 662 and 664 provide an audible indication, such as but not limited to an audible sound, to indicate any of the states or a statuses associated with remote 600.

Returning to FIG. 6A, in various embodiments remote 600 includes a vibratory mechanism, such as vibrator 622, operable to provide a physical motion that can be sensed by a user holding or having close proximity to the remote, and is used to indicate information related to the state or status of remote 600. By way of illustration, vibrator 622 may provide a vibration in remote 600 to indicate to a user that the microphone or microphones coupled to remote 600 have either establish bi-directional communications with a base station, or have terminated a previously established bi-directional communications with a base station. This feature is advantageous in that a user of the remote can receive a vibration when entering into a room indicating that the remote has established bi-directional communications with a base station, and vibrations when exiting a room indicating to the user that the remote has terminated any established bi-directional communications with a base station. This information is useful to the user to assure that the user knows whether any microphone included in the remote is or is not coupled to communicate with a base station without the need to look at the remote 600. This feature is advantageous when a remote is fastened to a user in a position that is not easily viewable from the user's perspective, such as the users belt at a user's waist level, or within the user's clothing, such as a pocket of the user.

In various embodiments, remote 600 includes fastener 675 operable to allow attachment of remote 600 to a user. In various embodiments, fastener 675 is formed as part of case 602. In various embodiments, fastener 675 is formed of the transmissive material used to form end area 630, and so does not interfere with the transmissions to and from remote 600 or with the reception of signals at remote 600.

In various embodiments, remote 600 includes one or more actuatable devices 606A-E on a front surface 607. Actuatable devices 606A-E are not limited to any particular number of devices, and may includes any number of individual devices. Actuatable devices 606A-E are not limited to any particular types of devices. Actuatable devices 606A-E may include pushbuttons, mouse buttons, scroll wheels, or any other type of device that allows actuation to provide input signals to remote 600. In various embodiments, actuatable devices 606A-E include any of the devices 112 described herein with respect to FIG. 1. In various embodiments, one or more of actuatable devices 606A-E perform more than one type of actuation function. By way of illustration, an actuation device such as but not limited to actuation device 606E operate as a mouse button for controlling an input when operated using side pressure, and may act as a pushbutton when pressed in a downward direction perpendicular to the direction of the side pressure.

In various embodiments, remote 600 includes an output device 640, such as but not limited to a display. Output device 640 is not limited to any particular type of output device, and may include any type of output device, including but not limited to the output devices 113 described herein with respect to FIG. 1.

In various embodiments, remote 600 includes a battery 620. In various embodiments, battery 620 is located within case 602 in handle area 604. In various embodiments, battery 620 is a non-rechargeable and replaceable battery intended to operate remote 600 for a given time, and then to be replaced with a new battery. In various embodiments, battery 620 is a rechargeable battery intended to power remote 600 and to be rechargeable a number of times. In various embodiments, battery 620 is a nickel-cadmium (NiCd) battery. In various embodiments, battery 620 is a nickel metal hydride (NiMH) battery. In various embodiments, battery 620 is a lithium-ion (Li-Ion) battery.

In various embodiments, remote 600 includes one or more connections coupled to battery 620 for coupling to an electrical power source for recharging battery 620. In various embodiments, remote 600 includes a connection 642 in the end of handle areas 604 for coupling to battery 620 for recharging battery 620. In various embodiments, remote 600 includes a connection 644 in the side of remote 600 for coupling to battery 620 for recharging battery 620.

In various embodiments, battery 620 includes a battery type that is rechargeable without a coupling that requires a direct physical connection between the battery 620 through any opening in the case 602.

It would be understood that in various embodiments, battery 620 may include a plurality of batteries coupled to operate as a battery unit. In various embodiments, battery 620 is operable to provide more than one different voltage level to remote 600, or provide an output of one or more different voltage levels to power devices coupled to remote 600, including but not limited to microphone 650.

FIG. 7 illustrates a base station 700 according to various embodiments. Base station 700 is not limited to any particular type of base station. In various embodiments, base station 700 is base station 112 as shown in FIG. 1. In various embodiments, base station 700 is any one or more of the base stations 221-227 illustrated in FIG. 2.

Referring to FIG. 7, in various embodiments base station 700 includes a case 702 including one or more transmitters and one or more receivers represented by transmitter/receiver 720. In various embodiments, transmitter/receiver 720 includes at least one transmitter and receiver operable to communicatively couple, using bi-direction commutations, base station 700 with at least one remote (not shown in FIG. 7), such as any of the remotes 110 and 117 through 119, 241-248, and 600 as shown in FIG. 1, FIG. 2, and FIGS. 6A and 6B respectively.

In various embodiments, transmitter/receiver 720 includes a transmitter operable to generate and to transmit a beacon signal as described herein. In various embodiments, the generated beacon signal is applied to one or more transmission devices 722. In various embodiments, transmission devices 722 are light emitting diodes operable to emit light in at a particular wavelength, or within a particular range of wavelengths. In various embodiments, transmission devices 722 are operable to emit infrared emissions having a wavelength of 870 nanometers. In various embodiments, transmission devices have a "off" portion of the duty cycle for the beacon signal that is at least one thousand times as long as the "on" portion of the duty cycle for the beacon signal. In various embodiments wherein the transmission devices 722 are light emitting diodes, a current of 1 to 3 amperes flows through each of the light emitting diodes during the some portion or portions of the "on" portion of the duty cycle for the beacon signal. The high current flow through the light emitting diodes exceeds the normal maximum limit for forward current through these diodes, but due to the fractional portion of the entire duty cycle during which the light emitting diode actually sees the forward current flow, the junction temperature of the light emitting diode is not exceeded, and therefore the light emitting diode is not damaged by these levels of forward current.

In various embodiments, transmission devices 722 are physically mounted so as to protrude through surface 750 of case 702 so that a protruding portion of transmission devices 722 can provide emissions outside case 702. In various embodiments transmission devices 722 are merely holes formed in case 702 operable to allow sound waves to be emitted from case 702. In such instances, base station 700 includes at least a transmitter included within or as part of transmitter/receiver 720 operable to provide a sound wave or waves capable of including information indicative of a frequency or a channel on which base station 700 can establish bi-directional communications.

In various embodiments, transmitter/receiver 720 is coupled to at least one antenna, such as but not limited to antenna 724. Antenna 724 is not limited to any particular type of antenna, and includes any type of antenna operable to transmit and receive the bi-directional communications from and to base station 700.

In various embodiments, antenna 724 is a dipole antenna. In various embodiments, antenna 724 is a microstrip antenna. In various embodiments, antenna 724 is a fractal antenna.

In various embodiments, antenna 724 is located within case 702, and opening 724 is provided in surface 750 of case 702 to allow the transmissions and the reception of signals to and from antenna 724. The size and shape of opening 724 is not limited to any particular size and shape, and can be any size and shape operable to minimize or eliminate any interference the case 702 might cause with the transmission and reception of signals to and from antenna 724. In various embodiments, antenna 724 is located on surface 750. In various embodiments, antenna 724 is locate outside case 702, and coupled to the transmitter/receiver 720 though some type of coupling through case 702.

In various embodiments, base station 700 includes a plurality of antenna. Base station 700 is not limited to any particular number of antennas, and may include any number of antenna determined to be desirable for use in the particular application in which base station 700 is being applied. In various embodiments, base station 700 includes antenna 724 and antenna 726, wherein antenna 724 and antenna 726 are arranged to have a longitudinal axis perpendicular to one another. Such an arrangement of antenna with a perpendicular arrangement of longitudinal axis provides more complete coverage of an area of transmission and reception for any signals transmitted from and intended to be received base station 700. In various embodiments, antenna 726 is located within case 702, and opening 727 is provided in surface 750 of case 702 to allow the transmissions and the reception of signals to and from antenna 726. The size and shape of opening 727 is not limited to any particular size and shape, and can be any size and shape operable to minimize or eliminate any interference the case 702 might cause with the transmission and reception of signals to and from antenna 726. In various embodiments, antenna 726 is located on surface 750. In various embodiments, antenna 726 is locate outside case 702, and coupled to the transmitter/receiver 720 though some type of coupling through case 702.

In various embodiments, base station 700 includes a power input 704. Power input 704 is not limited to any particular type of input, and may include any type of connection operable to allow connection of base station 700 to a source of electrical power. In various embodiments, power input 704 is operable to couple to a source of low voltage direct current power. Low voltage direct current (DC) operation includes direct current having a voltage of 40 volts DC or less. In various embodiments, low voltage operation includes direct current having a voltage of approximately 12 volts.

In various embodiments, power input 704 is coupled to transmitter/receiver 720, and is operable to provide power to transmitter/receiver 720. In various embodiments, power input 704 is coupled to amplifier 710, and is operable to provide power to amplifier 710. Amplifier 710 is not limited to any particular type of amplifier, and may include one or more amplifiers operable to amplify any of the signals present in base station 700, including but not limited to any signals transmitted from or received by base station 700. In various embodiments, amplifier 710 is coupled to input 712. Input 712 is not limited to any particular type of input, and includes but is not limited to an input operable to receive any type of audio input signals. In various embodiments, input 712 is operable to couple video signals to amplifier 710.

In various embodiments, amplifier 716 is coupled to output 714. Output 714 is not limited to any particular type of output, and may include but is not limited to an audio output. In various embodiments, output 714 includes a video output.

In various embodiments, base station 700 includes one or a plurality of outputs 740. In various embodiments, outputs 740 includes one or a plurality of different types of outputs, including but not limited to an RS-232 compliant output, an audio signal output, and video signal output.

In various embodiments, base station 700 includes one or more indicators 728. Indicators 728 are not limited to any particular type of indicators, and may include any type of indicators operable to provide information. In various embodiments, indicators 728 are light emitting diodes. In various embodiments, indicators 728 provide information to indicate that power is present at the base station. In various embodiments, indicators 728 provide information related to any radio frequency links established with the base station. In various embodiments, indicators 728 provide information related to the beacon signal at the base station, including providing an indication as to whether or not a beacon signal is being transmitted by the base station 700. In various embodiments, indicators 728 provide information related to one or more communication ports included in base station 700.

In various embodiments, base station 700 includes a display 760. Display 760 is not limited to any particular type of display, and may include any type of display operable to display information. In various embodiments, display 760 is operable to display information related to a frequency or a channel which the base station has selected for use in establishing bi-directional communications.

Figure 8:
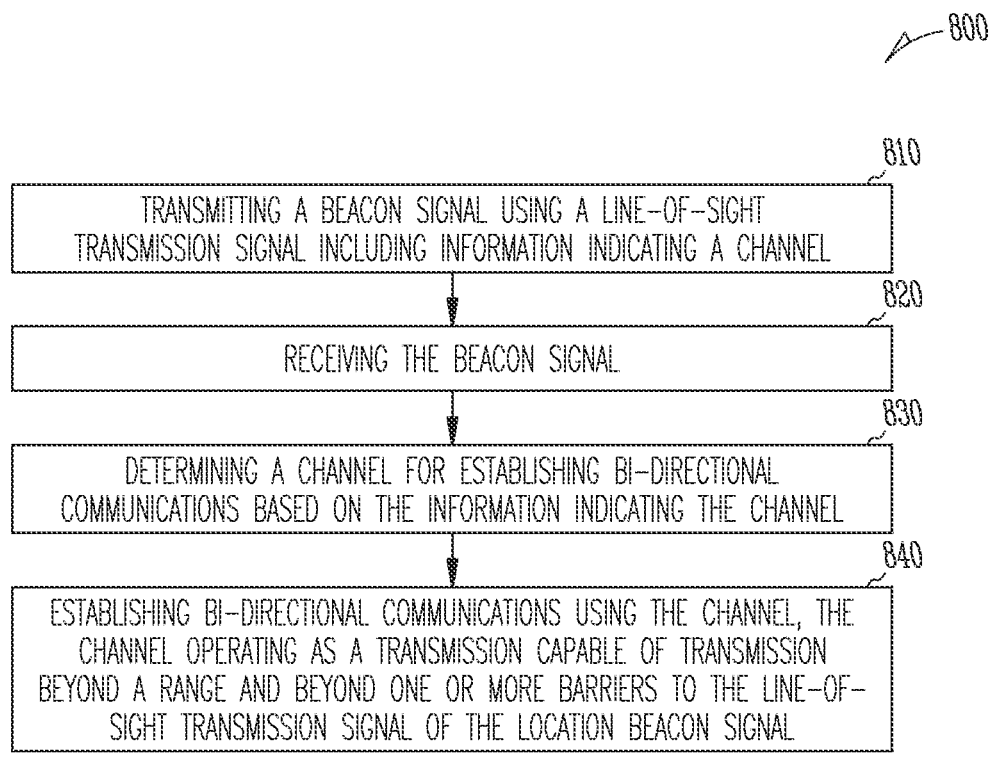
FIG. 8 illustrates a flowchart for various methods according to embodiments of the present invention.

FIG. 8 illustrates a flowchart for various methods 800 according to various embodiments. At block 810 method 800 includes transmitting a beacon signal using a line-of-sight transmission signal including information indicating a channel. In various embodiments, transmitting the beacon signal using the line-of-sight transmission signal includes scanning passively a plurality of channels designated for bi-directional communications, determining which of the plurality of channels do not have transmissions that are received during the passive scanning, and selecting one of the plurality of channels that did not have transmissions received during the passive scanning.

In various embodiments, including information indicating a channel includes providing pulses at a time internal wherein the time internal indicates the channel. In various embodiments, transmitting the beacon signal includes transmitting the beacon signal at an infrared frequency.

At block 820 method 800 includes receiving the beacon signal.

At block 830 method 800 includes determining a channel for establishing a bi-directional communications based on the information indicating the channel. In various embodiments, determining a channel includes determining a time period of a pulse in a received beacon signal. In various embodiments, determining a channel for establishing a bi-directional communications includes measuring a time interval between leading edges of pulses on the beacon, wherein the time interval is associated with the channel used for the bi-directional transmission.

At block 840 method 800 includes establishing bi-directional communications using the channel, the channel operating as a transmission capable of transmission beyond a range and beyond one or more barriers to the line-of-sight transmission signal of the beacon signal. In various embodiments, establishing the bi-directional communications using the channel includes using a radio frequency signal for the bi-directional communications.

Embodiments have been described including an apparatus comprising a remote operable to receive a non-radio frequency beacon signal, the non-radio frequency beacon signal transmitted within and contained substantially within an approximate line-of-sight transmission space, the non-radio frequency beacon signal including at least one channel information portion, wherein the channel information portion includes information indicating a radio frequency, the remote operable to establish bi-directional communications using the radio frequency designated by the at least one channel information portion.

Embodiments have been described including an apparatus comprising a base station operable to transmit a non-radio frequency beacon signal including at least one channel information portion, wherein the channel information portion includes information indicative of a radio frequency, the base station operable to transmit and receive bi-directional communications on the radio frequency indicated by the channel information portion of the non-radio frequency beacon signal.

Embodiments have been described including a method comprising transmitting a beacon signal using a line-of-sight transmission signal, wherein the line-of-sight transmission signal includes channel information indicating a channel, receiving the beacon signal, determining a channel for establishing a bi-directional communications based on the channel information, and establishing bi-directional communications using the channel, the channel operating as a transmission capable of transmission beyond a range and beyond one or more barriers to the line-of-sight transmission signal of the beacon signal.

Embodiments have been described including a system comprising, one or more remotes, and a plurality of base stations, wherein each of the plurality of base stations is located in an enclosure, wherein each the plurality of base stations transmits a beacon signal that is detected by a remote located within its enclosure and wherein each the plurality of base stations selects a radio frequency channel for establishing bi-directional communications with a remote located within its enclosure, wherein the plurality of base stations include a first base station and a second base station, wherein the first and second base stations are located in a first and a second enclosure, respectively, wherein the remotes are operable to automatically establish bi-directional communications over a radio frequency channel with the first base station when the remote is within an approximate line-of-site transmission space defined by the first enclosure and by the beacon signal transmitted by the first base station, wherein the remotes are operable to automatically establish bi-directional communications over a radio frequency channel with the second base station when the remote is within an approximate line-of-site transmission space defined by the second enclosure and by the beacon signal transmitted by the second base station, and wherein each remote is operable to terminate the bi-directional communications with its respective base station when the remote is no longer receiving the beacon signal transmitted by its respective base station.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, comprising:
   a remote for controlling one or more devices in connection with a base station located in an environment including an approximate line-of-sight transmission space, the remote operable to continuously receive an infrared frequency beacon signal, transmitted by the base station using a transmitter, wherein the infrared frequency beacon signal includes a sequence of pulses representing at least one channel information portion, wherein the at least one channel information portion includes information indicating a radio frequency,
   the infrared frequency beacon signal transmitted within and contained substantially within the approximate line-of-sight transmission space between said transmitter of the base station and the remote,
   the remote operable to establish bi-directional communications with the base station for controlling one or more devices and configured to transmit an audio signal representative of sounds received at a microphone coupled to the remote using the radio frequency designated by the at least one channel information portion,
   wherein the remote is configured to detect that it has left said approximate line-of-sight transmission space by detecting termination of reception of said infrared frequency beacon signal, and
   the remote is further configured to terminate the bi-directional communications using said radio frequency when the remote detects the termination of reception of said infrared frequency beacon signal.

2. The apparatus of claim 1, wherein the remote includes a watchdog timer, the watchdog timer configured to terminate any established bi-directional communications between the remote and the base station when the remote does not detect the infrared frequency beacon signal within a predefined time interval.

3. The apparatus of claim 1, wherein the remote includes at least one receiving device operable to receive the infrared frequency beacon signal, and at least one device to receive and to transmit the radio frequency, wherein both the at least one receiving device and the at least one device to receive and transmit radio frequency are enclosed in a case comprising a solid material that is substantially transmissive of the infrared frequency beacon signal and the radio frequency.

4. The apparatus of claim 3, wherein the case is a composite including acrylonitrile butadiene styrene plastic.

5. The apparatus of claim 1, wherein the remote is a battery powered wireless remote.

6. A system, comprising:
   a base station operable to transmit an infrared frequency beacon signal including a sequence of pulses, the sequence of pulses representing at least one channel information portion; and
   a remote for controlling one or more devices in connection with the base station located in an environment including an approximate line-of-sight transmission space, the remote operable to continuously receive the infrared frequency beacon signal transmitted by the base station,
   wherein the at least one channel information portion includes information indicative of a radio frequency, the base station is operable to transmit and receive bi-directional communications with the remote on the radio frequency indicated by the at least one channel information portion of the infrared frequency beacon signal to control the one or more devices,
   the remote includes a microphone coupled to the remote and configured to transmit an audio signal representative of sounds received at the microphone using the radio frequency, the remote is configured to detect that it has left said approximate line-of-sight transmission space by detecting termination of reception of said infrared frequency beacon signal, and the remote is further configured to terminate the bi-directional communications using said radio frequency when the remote detects the termination of reception of said infrared frequency beacon signal.

7. The system of claim 6, wherein the information indicative of the radio frequency is a time interval between a same portion of any two subsequent pulses included in the infrared frequency beacon signal.

8. The system of claim 6, wherein the base station includes two separate antennas, each of the two separate antennas having a longitudinal axis arranged perpendicular to each other, the two separate antennas operable to transmit and receive signals at the radio frequency.

9. The system of claim 6, wherein the base station includes at least one of light emitting diodes operable to transmit the infrared frequency beacon signal.

10. The system of claim 6, wherein the base station includes at least one output operable to output a signal representative of a signal received during bi-directional communications to control the one or more devices.

11. A method, comprising:

transmitting an infrared frequency beacon signal including a sequence of pulses by a base station in an approximate line-of-sight transmission space, the sequence of pulses representing channel information indicating a channel;

continuously receiving the infrared frequency beacon signal with a remote control device;

determining a channel for establishing bi-directional communications based on the channel information in the received infrared frequency beacon signal by the remote control device;

establishing bi-directional communications between the remote control device and the base station using the channel, the channel operating as a transmission capable of transmission beyond the line-of-sight transmission space of the infrared frequency beacon signal;

transmitting an audio signal generated by a microphone coupled to the remote control device when the audio signal representative of sounds is received at the microphone using said channel;

transmitting one or more control signals from the remote control device to control one or more devices connected to the base station using said channel upon activation of one or more actuatable devices of the remote control device;

determining by the remote control device that it has left said approximate line-of-sight transmission space by detecting termination of reception of the infrared frequency beacon signal; and terminating the bi-directional communications in response to the determining that the remote control device has left said approximate line-of-sight transmission space by detecting of the termination of the infrared frequency beacon signal.

12. The method of claim 11, wherein transmitting the infrared frequency beacon signal using the line-of-sight transmission signal includes:

scanning passively a plurality of channels designated for bi-directional communications; determining which of the plurality of channels do not have transmissions that are received during the passive scanning;

selecting one of the plurality of channels that did not have transmissions received during the passive scanning; and including in the channel information an indication including the selected one of the plurality of channels.

13. The method of claim 11, wherein determining the channel for establishing the bi-directional communications includes measuring a time interval between pulses on the infrared frequency beacon signal, wherein the time interval is associated with the channel used for the bi-directional communications.

14. The method of claim 11, wherein establishing the bi-directional communications using the channel includes using a radio frequency signal for the bi-directional communications.

15. A system, comprising:

a plurality of base stations, wherein each of the plurality of base stations is located in an enclosure with a corresponding approximate line-of-sight transmission space, one or more remotes for controlling one or more devices in connection with the base station located in the enclosure including the approximate line-of-sight transmission space, at least one of the remotes including a microphone configured to generate an audio signal representing of sounds received at the microphone;

wherein each of the plurality of base stations transmits an infrared frequency beacon signal including a sequence of pulses that is detectable by the one or more remotes located within the approximate line-of-sight transmission space of its enclosure, the sequence of pulses representing information indicative of a radio frequency channel, wherein the one or more remotes continuously receives the infrared frequency beacon signal and selects the radio frequency channel for establishing bi-directional communications with the base station to control one or more devices located within its enclosure, wherein the plurality of base stations includes a first base station and a second base station, wherein the first and second base stations are located in a first and a second enclosure, respectively, wherein the one or more remotes are operable to automatically establish bi-directional communications with the first base station over a first radio frequency channel selected based on the infrared frequency beacon signal transmitted by the first base station when the one or more remotes are within the approximate line-of-sight transmission space defined by the first enclosure and by the infrared beacon signal transmitted by the first base station, at least one of the one or more remotes transmitting the audio signal generated by said microphone using the first radio frequency channel, wherein the one or more remotes are operable to automatically establish bi-directional communications with the second base station over a second radio frequency channel selected based on the infrared frequency beacon signal transmitted by the second base station when the one or more remotes are within an approximate line-of-sight transmission space defined by the second enclosure and by the infrared beacon signal transmitted by the second base station; and wherein each of the one or more remotes is operable to terminate the bi-directional communications with its respective base station when the remote detects that it has left the approximate line-of-sight transmission space of the respective base station by detecting that it is no longer receiving the infrared frequency beacon signal transmitted by the respective base station.

16. The system of claim 15, wherein each remote includes a microphone, the remote operable to transmit signals representative of sounds received at the microphone, to a base station for output at one or more speakers during bi-directional communications.

17. The system of claim 15, wherein each remote includes at least one actuatable device for adjusting the volume of an audio output provided at the speakers.

18. The system of claim 15, wherein each remote includes a plurality of actuatable input devices for controlling a projector coupled to the base station.

19. The system of claim 15, wherein the enclosures are adjacent rooms in a school.

20. The system to claim 15, wherein the infrared frequency beacon signal further includes pulses provided at a time interval, the time interval indicating said channel.

* * * * *